: US 11,665,221 B2
: May 30, 2023

(12) United States Patent
Joshi et al.

(54) COMMON SERVICES MODEL FOR MULTI-CLOUD PLATFORM

(71) Applicant: Nutanix, Inc., San Jose, CA (US)

(72) Inventors: Akhilesh Joshi, San Jose, CA (US); Gaurav Poothia, Redmond, WA (US); Heiko Friedrich Koehler, Shoreline, WA (US); Naorem Khogendro Singh, San Jose, CA (US); Pranav Desai, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/376,581

(22) Filed: Jul. 15, 2021

(65) Prior Publication Data
US 2022/0159093 A1 May 19, 2022

Related U.S. Application Data

(60) Provisional application No. 63/113,614, filed on Nov. 13, 2020.

(51) Int. Cl.
| G06F 15/16 | (2006.01) |
| H04L 67/01 | (2022.01) |
| G06N 20/00 | (2019.01) |
| G06F 8/65 | (2018.01) |
| G06N 5/04 | (2023.01) |

(52) U.S. Cl.
CPC .............. H04L 67/01 (2022.05); G06F 8/65 (2013.01); G06N 20/00 (2019.01); G06N 5/04 (2013.01)

(58) Field of Classification Search
CPC .......... H04L 67/01; G06N 20/00; G06N 5/04; G06F 8/65

USPC .......................................................... 709/203
See application file for complete search history.

(56) References Cited

U.S. PATENT DOCUMENTS

| 7,237,360 B2 | 7/2007 | Moncho et al. |
| 7,310,664 B1 | 12/2007 | Merchant et al. |
| 8,543,665 B2 | 9/2013 | Ansari et al. |
| 8,549,518 B1 | 10/2013 | Aron et al. |

(Continued)

FOREIGN PATENT DOCUMENTS

| CN | 101916200 B | 8/2015 |
| EP | 2831746 A1 | 2/2015 |

(Continued)

OTHER PUBLICATIONS

U.S. Appl. No. 16/522,567, titled "Apparatus and Method for Deploying a Machine Learning Inference as a Service at Edge Systems", dated Jul. 25, 2019, pp. all pages of application as filed.

(Continued)

*Primary Examiner* — Moustafa M Meky
(74) *Attorney, Agent, or Firm* — Stoel Rives LLP

(57) ABSTRACT

A platform-as-a-service infrastructure and application lifecycle manager is configured to implement a common services model to deploy selected services from a common set of services to service domains hosted on multiple different cloud platforms by abstracting dependence on availability of various additional supporting services, such as services that are platform-specific. The platform-as-a-service infrastructure and application lifecycle manager may also manage a lifecycle of available services, such as managing upgrades and/or patches to services.

29 Claims, 6 Drawing Sheets

(56) References Cited

U.S. PATENT DOCUMENTS

| | | |
|---|---|---|
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,729,411 B2 | 8/2017 | Purusothaman |
| 9,736,194 B1 | 8/2017 | Rao et al. |
| 9,747,287 B1 | 8/2017 | Bhardwaj et al. |
| 9,772,866 B1 | 9/2017 | Aron et al. |
| 9,836,296 B2 | 12/2017 | Vandikas et al. |
| 9,860,677 B1 | 1/2018 | Agerstam et al. |
| 9,917,865 B2 | 3/2018 | Arora et al. |
| 9,977,415 B2 | 5/2018 | Zimmerman et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,306,513 B2 | 5/2019 | Bartfai-walcott et al. |
| 10,489,138 B1 | 11/2019 | Wu et al. |
| 10,515,119 B2 * | 12/2019 | Kirk ............... G06F 16/24578 |
| 10,534,629 B1 | 1/2020 | St. Pierre et al. |
| 10,567,925 B2 * | 2/2020 | Ly ..................... H04W 4/06 |
| 10,652,226 B2 | 5/2020 | Islam et al. |
| 10,838,833 B1 | 11/2020 | Jibaja et al. |
| 10,893,116 B1 | 1/2021 | Koehler |
| 10,924,342 B2 | 2/2021 | Joshi et al. |
| 11,316,733 B1 | 4/2022 | Johson et al. |
| 2004/0177359 A1 | 9/2004 | Bauch et al. |
| 2005/0060328 A1 | 3/2005 | Suhonen et al. |
| 2008/0270515 A1 | 10/2008 | Chen et al. |
| 2009/0204711 A1 | 8/2009 | Binyamin |
| 2009/0260004 A1 | 10/2009 | Datta et al. |
| 2010/0008510 A1 | 1/2010 | Zayas |
| 2010/0175061 A1 | 7/2010 | Maeda et al. |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0304903 A1 | 11/2013 | Mick et al. |
| 2013/0332916 A1 | 12/2013 | Chinn et al. |
| 2014/0074539 A1 | 3/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer et al. |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0120893 A1 | 4/2015 | Sapaliga et al. |
| 2015/0261876 A1 | 9/2015 | Trikha et al. |
| 2015/0347542 A1 | 12/2015 | Sullivan et al. |
| 2016/0007138 A1 * | 1/2016 | Palanisamy ............ H04W 4/70 |
| | | 455/41.2 |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhury et al. |
| 2016/0098265 A1 | 4/2016 | Mahajan et al. |
| 2016/0112268 A1 | 4/2016 | Chung et al. |
| 2016/0156614 A1 | 6/2016 | Jain et al. |
| 2016/0197830 A1 | 7/2016 | Ulevitch et al. |
| 2016/0202964 A1 | 7/2016 | Butcher et al. |
| 2016/0216959 A1 | 7/2016 | Kurian et al. |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |
| 2016/0323361 A1 | 11/2016 | Austel et al. |
| 2016/0337104 A1 | 11/2016 | Kalligudd |
| 2016/0337175 A1 | 11/2016 | Rao |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0099176 A1 | 4/2017 | Jain |
| 2017/0102931 A1 | 4/2017 | Risbood et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 | 6/2017 | Suarez et al. |
| 2017/0180346 A1 | 6/2017 | Suarez et al. |
| 2017/0185507 A1 | 6/2017 | Eberlein |
| 2017/0185922 A1 | 6/2017 | Lange et al. |
| 2017/0187807 A1 | 6/2017 | Clernon |
| 2017/0201585 A1 | 7/2017 | Doraiswamy et al. |
| 2017/0244600 A1 | 8/2017 | Hussein et al. |
| 2017/0257432 A1 | 9/2017 | Fu et al. |
| 2017/0289173 A1 | 10/2017 | Resch et al. |
| 2017/0315820 A1 | 11/2017 | Entezari et al. |
| 2017/0347264 A1 | 11/2017 | Holland et al. |
| 2018/0007055 A1 | 1/2018 | Infante-lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 * | 4/2018 | Ly ....................... H04L 12/185 |
| 2018/0123820 A1 | 5/2018 | Kim |
| 2018/0159745 A1 | 6/2018 | Byers et al. |
| 2018/0167392 A1 | 6/2018 | Zakaria |
| 2018/0219877 A1 | 8/2018 | Hsu et al. |
| 2018/0234351 A1 | 8/2018 | Amento et al. |
| 2018/0293463 A1 | 10/2018 | Brown |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0309819 A1 | 10/2018 | Thompson |
| 2018/0314808 A1 | 11/2018 | Casey et al. |
| 2018/0324204 A1 | 11/2018 | McClory et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0109816 A1 | 4/2019 | Liu et al. |
| 2019/0121889 A1 | 4/2019 | Gold et al. |

(56) References Cited

U.S. PATENT DOCUMENTS

| | | |
|---|---|---|
| 2019/0123959 A1 | 4/2019 | Joshi et al. |
| 2019/0141022 A1 | 5/2019 | Reeve et al. |
| 2019/0146773 A1 | 5/2019 | Attard |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1 | 6/2019 | Vasudevan et al. |
| 2019/0190776 A1 | 6/2019 | Bregman et al. |
| 2019/0213273 A1 | 7/2019 | Vasudevan et al. |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0319919 A1 | 10/2019 | Knecht et al. |
| 2019/0320038 A1 | 10/2019 | Walsh et al. |
| 2019/0342182 A1 | 11/2019 | Dhanabalan et al. |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1 | 3/2020 | Lee et al. |
| 2020/0097274 A1 | 3/2020 | Sarkar et al. |
| 2020/0104723 A1* | 4/2020 | Reissner ............... G06F 8/38 |
| 2020/0112487 A1 | 4/2020 | Inamdar et al. |
| 2020/0122038 A1* | 4/2020 | Ebrahimi ............... G06N 7/005 |
| 2020/0177503 A1 | 6/2020 | Hooda et al. |
| 2020/0177630 A1 | 6/2020 | Penner et al. |
| 2020/0218580 A1 | 7/2020 | Kim |
| 2020/0258627 A1 | 8/2020 | Setegn et al. |
| 2020/0274776 A1 | 8/2020 | Nishikawa |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1 | 2/2021 | Nelson-Gal et al. |
| 2021/0067607 A1 | 3/2021 | Gardner et al. |
| 2021/0084670 A1 | 3/2021 | Chauhan et al. |
| 2021/0089408 A1 | 3/2021 | Park et al. |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0255846 A1 | 8/2021 | Kang et al. |
| 2021/0311764 A1 | 10/2021 | Rosoff et al. |
| 2021/0373965 A1 | 12/2021 | Hadas et al. |
| 2021/0400043 A1 | 12/2021 | Su et al. |
| 2022/0083389 A1 | 3/2022 | Poothia et al. |
| 2022/0121543 A1 | 4/2022 | Poothia et al. |
| 2022/0138070 A1 | 5/2022 | Mokashi et al. |
| 2022/0147336 A1 | 5/2022 | Joshi et al. |
| 2022/0279046 A1 | 9/2022 | Perng et al. |

FOREIGN PATENT DOCUMENTS

| | | |
|---|---|---|
| WO | 9945465 A1 | 9/1999 |
| WO | 2014007811 A1 | 1/2014 |
| WO | 2020096639 A1 | 5/2020 |

OTHER PUBLICATIONS

U.S. Appl. No. 16/666,242, titled "Scalable Centralized Internet-ofThings Manager", dated Oct. 28, 2019, pp. all pages of application as filed.

U.S. Appl. No. 16/920,235, titled "Apparatus and Method for Deploying a Mobile Device as a Data Source in an IoT System", dated Jul. 2, 2020, pp. all pages of application as filed.

U.S. Appl. No. 16/945,306, titled "Platform-as-a-Service Deployment Including Service Domains", dated Jul. 31, 2020, pp. all pages of application as filed.

Cano, Ignacio et al. "Curator: Self-Managing Storage for Enterprise Clusters"; University of Washington; published Mar. 2017; pp. all.

Poitras, Steven. "The Nutanix Bible" (Sep. 1, 2020), from https://nutanixbible.com/; pp. all.

Poitras, Steven. "The Nutanix Bible" (Sep. 17, 2019), from https://nutanixbible.com/ pp. all.

Poitras, Steven. "The Nutanix Bible" (Jul. 25, 2019), from https://nutanixbible.com/ pp. all.

U.S. Appl. No. 17/139,325 titled "Key Value Store in a Clustered Containerized System" filed Dec. 31, 2020, pp. all pages of application as filed.

U.S. Appl. No. 17/148,231 titled "Upgrade Systems for Service Domains" filed Jan. 13, 2021, pp. all pages of application as filed.

U.S. Appl. No. 17/187,220 titled "Generic Proxy Endpoints Using Protocol Tunnels Including Life Cycle Management and Examples for Distributed Cloud Native Services and Applications" filed Feb. 26, 2021, pp. all pages of application as filed.

U.S. Appl. No. 7/302,189 titled "User Interface and Health Status Monitoring for a Multi Service Domainsystem" filed Apr. 27, 2021, pp. all pages of application as filed.

U.S. Appl. No. 17/350,636 titled "AI Inference Hardware Resource Scheduling" filed Jun. 17, 2021, pp. all pages of application as filed.

U.S. Appl. No. 17/376,581 titled "Common Services Model for Multi-Cloud Platform" filed Jul. 15, 2021, pp. all pages of application as filed.

U.S. Appl. No. 16/522,567 titled "Machine Inference as a Service" filed Jul. 25, 2019, pp. all pages of application as filed.

"BtrPlace: An Open-Source Flexible Virtual Machine Scheduler", University Nice Sophia Antipolis, captured Aug. 1, 2020; pp. 1-8.

"Multi-Process Service", Nvidia, vR450, https://docs.nvidia.com/deploy/pdf/CUDA_Multi_Process_Service_Overview.pdf Jun. 2020, pp. 1-28.

"TensorFlow Serving", GitHub, https://github.com/tensorflow/serving Captured Aug. 1, 2020; pp. 1-4.

Abadi, Martin et al. "TensorFlow: Large-Scale Machine Learning on Heterogeneous Distributed Systems", Preliminary White Paper, http://download.tensorflow.org/paper/whitepaper2015.pdf Nov. 9, 2015, pp. 1-19.

Goldsborough, Peter et al. "A Tour of TensorFlow: Proseminar Data Mining", Technische Universität München, https://arxiv.org/pdf/1610.01178.pdf Oct. 2016, pp. 1-16.

Grammatikou, Mary et al. "GEMBus as a Service Oriented Platform for Cloud-Based Composable Services", 2011 IEEE Third International Conference on Cloud Computing Technology and Science, Nov. 1, 2011, pp. 666-671.

Hermann, Jeremy et al. "Meet Michelangelo: Uber's Machine Learning Platform", Uber Engineering, https://eng.uber.com/michelangelo-machine-learning-platform/ Sep. 5, 2017, pp. 1-17.

Hoare, Suchismita et al. "A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.

Jain, Paras et al. "Dynamic Space-Time Scheduling for GPU Inference", Massachusetts Institute of Technology, University of California, Berkeley; http://learningsys.org/nips18/assets/papers/102CameraReadySubmissionGPU_Virtualizaton%20(8).pdf 32nd Conference on Neural Information Processing Systems, Dec. 31, 2018, pp. 1-8.

Khaddar, Ajana El M. et al. "Smartphone: the Ultimate IoT and IoE Device", IntechOpen, "Smartphones from an Applied Research Perspective", pp. 137-162 (Ch. 7), Nov. 2, 2017, http://dx.doi.org/10.5772/intechopen.69734.

Lacoste, M. et al. "User-Centric Security And Dependability in The Clouds-of-Clouds", IEEE Cloud Computing, Sep. 2016, 64-75.

Li, Li E. et al. "Scaling Machine Learning as a Service", Uber Technologies, Inc., JMLR: Workshop and Conference Proceeding, http://proceedings.mlr.press/v67/jj17a/li17a.pdf Jun. 19-24, 2016, pp. 16-29.

Mahajan, Kshiteej et al. "THEMIS: Fair and Efficient GPU Cluster Scheduling", Cornell University, ARXIV:1907.01484 [CS.DC], Published Oct. 29, 2019, 15 pages.

(56) References Cited

OTHER PUBLICATIONS

Mijumbi, Rashid et al. "Learning Algorithms for Dynamic Resource Allocation in Virtualised Networks", Universitat Polit'ecnica de Catalunya, 08034 Barcelona, Spain, Publication date unknown, 4 pages.

Poitras, Steven. "The Nutanix Bible" (Mar. 2, 2020), from https://nutanixbible.com/, pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven. "The Nutanix Bible" (Jan. 12, 2016), from https://nutanixbible.com/, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/, pp. all.

Poitras, Steven. "The Nutanix Bible" (Jan. 3, 2017), from https://nutanixbible.com/, pp. all.

Poitras, Steven. "The Nutanix Bible" (Jan. 3, 2018), from https://nutanixbible.com/, pp. all.

Poitras, Steven. "The Nutanix Bible" (Sep. 4, 2015), from https://nutanixbible.com/, pp. all.

Poitras, Steven. "The Nutanix Bible" (Jan. 7, 2015), from http://stevenpoitras.com/the-nutanix-bible/ (Publication date based on indicated capture date by Archive.org; first publication date unknown), pp. all.

Poitras, Steven. "The Nutanix Bible" (Jan. 8, 2019), from https://nutanixbible.com/, pp. all.

Poitras, Steven. "The Nutanix Bible" (Jun. 8, 2017), from https://nutanixbible.com/, pp. all.

Poitras, Steven. "The Nutanix Bible" (Jun. 9, 2015), from http://stevenpoitras.com/the-nutanix-bible/ (Publication date based on indicated capture date by Archive.org; first publication date unknown), pp. all.

Poitras, Steven. "The Nutanix Bible" (Jun. 9, 2016), from https://nutanixbible.com/, pp. all.

Rafique, Ansar et al. "Towards Portability and Interoperability Support in Middleware for Hybrid Clouds", 2014 IEEE Infocom Workshop on Cross-Cloud Systems, Apr. 27, 2014, pp. 7-12.

Sun, Peng et al. "Towards Distributed Machine Learning in Shared Clusters: a Dynamically-Partitioned Approach", Cornell University: ARXIV: 1704.06738V1 [CS.CD], Published Apr. 22, 2017, 6 pages.

Warburton, Tim "An Intro to GPU Architecture and Programming Models | Tim Warburton, Virginia Tech", YouTube, Argonne National Laboratory Training https://www.youtube.com/watch?v=IGmPy8xpT4E Sep. 25, 2017, pp. 1-3.

Poitras, Steven. "The Nutanix Bible" (Mar. 2, 2021), from https://nutanixbible.com/; pp. all.

Poitras, Steven. "The Nutanix Bible" (Sep. 3, 2021), from https://nutanixbible.com/; pp. all.

Beguelin, Daniel "Turn Your Smartphone Into an IoT Device", IBM Developer https://developer.ibm.com/tutorials/iot-mobile-phone-iot-device-bluemix-apps-trs/, Nov. 10, 2015, pp. 1-12.

U.S. Appl. No. 16/526,816 titled "Serverless Data Pipelines for Edge Computing" filed Jul. 30, 2019, all pages of application as filed.

U.S. Appl. No. 17/141,870 titled "Apparatuses and Methods for Edge Computing Application Deployment in an IoT System" filed Jan. 5, 2021, pp. all pages of application as filed.

"From Pilot to Production: Secure Workspace IoT Endpoint Management at Scale", VMWare, Inc. https://www.vmware.com/products/workspace-one/workspace-iot.html, pp. 1-3.

Stoks, Jessie, "Workspace IoT Series: How Industry 4.0 Will Transform Your Mobile Strategy", VMware End-User Computing Blog https://blogs.vmware.com/euc/2019/02/workspace-iot-mobile-strategy.html, Feb. 20, 2019, pp. 1-5.

"Anthos", Google Cloud https://cloud.google.com/anthos, Apr. 21, 2020, pp. 1-26.

"Architecting For The Cloud: AWS Best Practice", Amazon Web Services https://d1.awsstatic.com/whitepapers/AWS_Cloud_Best_Practices.pdf, Oct. 2018, pp. 1-50.

"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.

"Cisco Edge Intelligence At-a-Glance", Cisco https://www.cisco.com/c/en/us/solutions/collateral/internet-of-things/at-a-glance-c45-743263.html, Nov. 3, 2020, pp. 1-3.

"Cisco Edge Intelligence Data Sheet", Cisco https://www.cisco.com/c/en/us/solutions/collateral/internet-of-things/datasheet-c78-743838.html, Aug. 17, 2020, pp. 1-8.

"Disaster Recovery for AWS IoT", AWS https://aws.amazon.com/solutions/implementations/disaster-recovery-for-aws-iot/, May 2021, pp. 1-6.

"Hybrid Cloud with AWS", AWS https://d1.awsstatic.com/whitepapers/hybrid-cloud-with-aws.pdf, Nov. 2020, pp. 1-20.

"IBM Edge Application Manager", IBM https://www.ibm.com/cloud/edge-application-manager, May 5, 2020.

"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.

"Key considerations for multicluster life-cycle management", Red Hat: Advanced Cluster Management for Kubernetes https://www.redhat.com/rhdc/managed-files/ma-key-considerations-multicluster-lifecycle-management-infographic-f27597-202107-en.pdf, Jul. 2021, pp. 1.

"Key considerations for policy-based governance, risk, and compliance", Red Hat: Advanced Cluster Management For Kubernetes https://www.redhat.com/rhdc/managed-files/ma-considerations-governance-risk-compliance-infographic-f28360-202107-en.pdf, Jul. 2021, pp. 1.

"MPRM: An Overview", ProSyst http://documentation.bosch-si.com/iot/PRM/v6.0/welcome/mprm_functional.html, Jun. 13, 2017, pp. 1-3.

"Multicloud Application Patterns", VMWare Docs https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.

"Red Hat Expands Workload Possibilities Across the Hybrid Cloud with Latest Version of OpenShift", RedHat https://www.redhat.com/en/about/press-releases/red-hat-expands-workload-possibilities-across-hybrid-cloud-latest-version-openshift, Jun. 28, 2021, pp. 1-9.

"Setting up ServiceNow Cloud Management", DxSherpa https://dxsherpa.com/blogs/setting-up-servicenow-cloud-management/, Jul. 19, 2018, pp. 1-10.

"VIDEO—Intro to IBM Edge Application Manager", IBM https://www.ibm.com/cloud/blog/intro-to-ibm-edge-application-manager, May 13, 2020, pp. 1-16.

"VMware Cloud Universal—A flexible subscription program to accelerate multi-cloud objectives", VMware | Solution Overview https://www.vmware.com/content/dam/digitalmarketing/vmware/en/pdf/products/vmware-cloud-universal-solution-brief.pdf, Feb. 2021, pp. 1-4.

"Welcome to Azure Arc", YouTube, Microsoft Azure https://www.youtube.com/watch?v=3zdJJ97pNT4, Feb. 19, 2020, pp. 1.

Almeida, Bruno, "EKS Anywhere and ECS Anywhere Multicloud Services", NetApp https://cloud.netapp.com/blog/cvo-blg-eks-anywhere-and-ecs-anywhere-multicloud-services, Mar. 10, 2021, pp. 1-11.

Carey, Scott, "The major hybrid cloud options compared: AWS Outposts vs Azure Stack vs Google Anthos", ComputerWorld https://www.computerworld.com/article/3428108/the-major-hybrid-cloud-options-compared-aws-outposts-vs-azure-stack-vs-google-anthos.html, Nov. 6, 2019, pp. 1-9.

(56) References Cited

OTHER PUBLICATIONS

Holzle, Urs, et al., "Introducing Anthos: An entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.
Iyengar, Ashok, et al., "Clusters at the Edge", IBM https://www.ibm.com/cloud/blog/clusters-at-the-edge, Dec. 9, 2020, pp. 1-13.
Iyengar, Ashok, "Data at the Edge", IBM fittps://www.ibm.com/cloud/blog/data-at-the-edge, Jun. 4, 2021, pp. 1-13.
Lewis, Sarah, "Cloudify", TechTarget https://www.techtarget.com/searchcloudcomputing/definition/Cloudify, Jun. 2019, pp. 1.
Manicka, Naveen, et al., "Simplify IoT Edge-to-Multi-Cloud Data Flow with Cisco Edge Intelligence", Cisco | Cisco Blogs https://blogs.cisco.com/developer/edge-intelligence-sandbox-lab, Aug. 6, 2020, pp. 1-7.
Marko, Kurt, "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.
Mohamed, Riaz, "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.
Morabito, Roberto, et al., "A Framework Based on SDN and Containers for Dynamic Service Chains on IoT Gateways", Proceedings of the Workshop on Hot Topics in Container Networking and Networked Systems. Ericsson Research, NomadicLab, Aug. 11, 2017, pp. 42-47.
MSV, Janakiram, "Google Forays Into Edge Computing With Cloud IoT Edge And TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.
MSV, Janakiram, "Why Azure Arc Is A Game Changer For Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.
Nolle, Tom, "Guide to Google Anthos architecture and management", TechTarget https://www.techtarget.com/searchcloudcomputing/tip/Guide-to-Google-Anthos-architecture-and-management, Aug. 27, 2020, pp. 1-7.
Poccia, Danilo, "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.
Shalom, Nati, "Simplifying Hybrid Cloud Deployments With AWS EKS And Outpost", Cloudify https://cloudify.co/blog/simplifying-hybrid-cloud-deployments-with-aws-eks-and-outpost/, Feb. 24, 2021, pp. 1-13.
Stakun, Jaroslaw, "Introduction to Red Hat OpenShift Container Platform", Open Virtualization Pro https://www.openvirtualization.pro/red-hat-openshift-container-platform/, Apr. 26, 2019, pp. 1.
Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.
"Application Monitoring on Red Hat OpenShift Container Platform (RHOCP) with Prometheus and Grafana", IBM Cloud Pakfor Applications https://www.ibm.com/docs/en/cloud-paks/cp-applications/4.3?topic=SSCSJL_4.3.x/guides/guide-app-monitoring-ocp4.2/guide-app-monitoring-ocp4.2.html, Jun. 28, 2021, pp. 1-10.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Comprehensive Guide on Upgrading PKS", PKS 1.3, Apr. 2019, pp. 1-45.

"Enabling Monitoring for User-defined Projects", https://docs.openshift.com/container-platform/4.6/monitoring/enabling-monitoring-for-user-defined-projects.html retrieved May 24, 2022 Yelevant to OpenShift Container Platform 4.6 general avaibility Oct. 27, 2020, pp. 1-13.
"How to adopt a multi-cluster strategy for your applications in Anthos", YouTube | Google Cloud Tech https://www.youtube.com/watch?v=ZhF-rTXq-US&list=PLIivdWyY5sqKN73vzKpg2p2JmOGoANOCG&index=6, May 29, 2020, pp. 1.
"How to get started with Anthos on Google Cloud", YouTube | Google Cloud Tech https://www.youtube.com/watch?v=ghFiaz7juoA&list=PLIivdWyY5sqKN73vzKpg2p2JmOGoANOCG&index=4, Apr. 30, 2020, pp. 1.
"How to Troubleshoot PKS Upgrade Issues", VMware Tanzu Supprt Hub https://community.pivotal.io/s/article/how-to-troubleshoot-pks-upgrade-issues?language=en_US, Jul. 17, 2019, pp. 1-11.
"Installation and Update OpenShift Container Platform Installation Overview", https://docs.openshift.com/container-platform/4.5/architecture/architecture-installation.html retrieved May 24th relevant to OpenShift Container Platform 4.5 general availability Jul. 13, 2020, pp. 1-17.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Managing Metrics", https://docs.openshift.com/container-platform/4.6/monitoring/managing-metrics.html#managing-metrics retrieved May 24, 2022 relevant to OpenShift Container Platform 4.6 general availability Oct. 27, 2020, pp. 1-14.
"Migrating Kubernetes apps to Serverless with Cloud Run on Anthos", YouTube | Google Cloud Tech https://www.youtube.com/watch?v=OT5UliS9j8A, Nov. 19, 2019, pp.
"Monitoring Project and Application Metrics Using the Developer Perspective", https://docs.openshift.com/container-platform/4.9/applications/odc-monitoring-project-and-application-metrics-using-developer-perspective.html#monitoring-project-and-application-metrics-using-developer-perspective retrieved May 24, 2022 relevant to, OpenShift 4.9 general availability Oct. 18, 2020, pp. 1-7.
"New Technology Projection: The Total Economic Impact Of Anthos", A Forrester Total Economic Impact https://services.google.com/fh/files/misc/the_total_economic_impact_of_anthos.pdf?mkt_tok=ODA4LUdKVyOzMTQAAAAGEowKcUaDaTyTRyPOrnurezYOwrjB4GihzmPwbs7dOqMaMhJZtax30f12Gx2-HRDm4SifQME2gL7297yUgZ3FEMxg5UdUp3eFaN5j_Oie7DOta28s, Nov. 2019, pp. 1-26.
"Observing Environments", https://access.redhat.com/documentation/en-us/red_hat_advanced_cluster_management_for_kubernetes/2.1/html-single/observing_environments/index retrieved May 24, 2022 relevant to Red Hat Advanced Cluster Management for Kubernetes 2.1, general availability Nov. 5, 2020, pp. 1-16.
"OpenShift Container Platform Architecture", https://docs.openshift.com/container-platform/4.5/architecture/architecture.html retrieved May 24, 2022 relevant to OpenShift Container Platform 4.5 general availability Jul. 13, 2020, pp. 1-10.
"OpenShift Container Platform Architecture", https://docs.openshift.com/container-platform/4.1/architecture/architecture.html retrieved May 27, 2022 Yelevant to OpenShift Container Platform 4.1 general availability Jun. 4, 2019, pp. 1-11.
"OpenShift Container Platform cluster monitoring, logging, and Telemetry", RedHat https://access.redhat.com/documentation/en-us/openshift_container_platform/4.2/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27th relevant to OpenShift Container Platform 4.1 general availability Jun. 4, 2019, pp. 1-13.
"Overview: OpenShift Container Platform", https://docs.openshift.com/container-platform/3.9/getting_started/index.html retrieved May 24th relevant to OpenShift Container Platform 3.9 general availability Oct. 2018, pp. 1-2.

(56) References Cited

OTHER PUBLICATIONS

"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0.pdf, Dec. 20, 2018, pp. 1-1591.
"Pivotal Container Service (PKS)", Pivotal Version 1.2 https://resources.docs.pivotal.io/pdfs/pks-1-2.pdf, Sep. 3, 2019, pp. 1-323.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved May 27, 2022 relevant to OpenShift Container Platform 4.1 general availability Jun. 4, 2019, pp. 1-16.
"Red Hat Enterprise Linux CoreOS (RHCOS)", https://docs.openshift.com/container-platform/4.5/architecture/architecture-rhcos.html retrieved May 24, 2022 relevant to OpenShift Container Platform 4.5 general availability Jul. 13, 2020, pp. 1-19.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 1-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.5/architecture/understanding-development.html retrieved May 24, 2022 relevant to OpenShift Container Platform 4.5 general availability Jul. 13, 2020, pp. 1-17.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"VMware Announces VMware Tanzu Portfolio to Transform the Way Enterprises Build, Run and Manage Software on Kubernetes", VMware News & Stories. https://news.vmware.com/releases/vmware-announces-vmware-tanzu-portfolio-to-transform-the-way-enterprises-build-run-and-manage-software-on-kubernetes, Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.
"What is Anthos Service Mesh?", Google Cloud | Anthos Service Mesh 1.4 https://cloud.google.com/service-mesh/v1.4/docs/overview, Dec. 20, 2019, pp. 1-4.
"What is Anthos?", YouTube | Google Cloud Tech https://www.youtube.com/watch?v=Qtwt7QcW4J8, Apr. 21, 2020, pp. 1.
Balkan, Ahmet A., "What's new in Cloud Run for Anthos", Google Cloud https://cloud.google.com/blog/products/serverless/new-features-in-cloud-run-for-anthos-ga, Dec. 11, 2019, pp. 1-7.
Banka, Roank, "Pivotal CloudFoundry on Google cloud platform", Slideshare https://www.slideshare.net/Pivotal/pivotal-container-service-overview, Jul. 16, 2018, pp. 1-44.
Ben-David, Jacob, "Google Cloud's Anthos—Everything You Need To Know", Turbonomic Blog https://blog.turbonomic.com/google-clouds-anthos, Apr. 15, 2019, pp. 1-9.
Goodison, Donna, "Google Cloud Unleashes Managed Service Mesh, Serverless For Anthos", The Channel Co. CRN https://www.crn.com/news/cloud/google-cloud-unleashes-managed-service-mesh-serverless-for-anthos, Sep. 16, 2019, pp. 1-6.
Holzle, Urs et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr. 9, 2019, pp. 1-7.
Islam, Tariq et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Lin, Jennifer et al., "Anthos simplifies application modernization with managed service mesh and serverless for your hybrid cloud", Google Cloud https://cloud.google.com/blog/topics/hybrid-cloud/anthos-simplifies-application-modernization-with-managed-service-mesh-and-serverless-for-your-hybrid-cloud, Sep. 16, 2019, pp. 1-6.
Lozano, Fernando, "How to Update to Newer Red Hat OpenShift 4 Releases", Red Hat Developer https://developers.redhat.com/articles/2021/05/27/how-update-newer-red-hat-openshift-4-releases, May 27, 2021, pp. 1-20.
Malasi, Aman, "Google Anthos: Write Once, Run Anywhere", HCL Tech Blogs https://www.hcltech.com/blogs/google-anthos-write-once-run-anywhere, Aug. 26, 2019, pp. 1-2.
McLuckie, Craig, "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.
O'Keefe, Megan, "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.
Perry, Yifat, "Google Anthos: The First True Multi Cloud Platform?", NetApp https://cloud.netapp.com/blog/gcp-cvo-blg-google-anthos-the-first-true-multi-cloud-platform, Mar. 18, 2021, pp. 1-9.
Reid, Nate, "Upgrading VMware Enterprise PKS 1.2 to 1.3", YouTube https://www.youtube.com/watch?v=7pAxNWIxVLM, Jan. 28, 2019, pp. 1.
Schonbaum, Iftach, "Anthos — Google's Enterprise Hybrid & MultiCloud Platform", CloudZone https://medium.com/cloudzone/anthos-googles-enterprise-hybrid-multi-cloud-platform-7975e05a7729, Apr. 23, 2019, pp. 1-7.
"Architecting VMware Unified Access Gateway", https://www.youtube.com/watch?v=URSdJ9qCQKo&t=234s, Apr. 17, 2019, pp. 1.
"AWS Architecture Monthly—Internet of Things Jun. 2019", AWS | https://d1.awsstatic.com/whitepapers/architecture-monthly/AWS-Architecture-Monthly-June-2019.pdf, Jun. 2019.
"AWS IoT Greengrass", https://web.archive.org/web/20190624094650/https/aws.amazon.com/greengrass/, Jun. 2019, pp. 1-13.
"*AWS IoT* vs. *Google IoT* vs. *Azure IoT*", Bizety | https://www.bizety.com/2018/08/28/aws-iot-vs-google-iot-vs-azure-iot/, Aug. 28, 2018, pp. 1-7.
"Azure IoT Central intro walkthrough", https://www.youtube.com/watch?v=G32stXSwtyA&ab channel=MicrosoftDeveloper, Feb. 2018.
"Cloud Iot Core", https://web.archive.org/web/20190129000453/https:/cloud.google.com/iot-core/, Jan. 2019, pp. 1-10.

(56) References Cited

OTHER PUBLICATIONS

"Cloud IoT Core—Devices, configuration, and state", Google | https://web.archive.org/web/20190330153113/https://cloud.google.com/iot/docs/concepts/devices, Mar. 2019.
"Cloud Iot Core Private Beta", Google | https://web.archive.org/web/20170518022234/https://cloudgoogle.com/iot-core/, May 2017.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Google Cloud IoT Core", Google | https://www.slideshare.net/idof/google-cloud-iot-core, Sep. 2018.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT Core device-to-device communication", Google |https://cloud.google.com/community/tutorials/iot-device-to-device, Dec. 2017.
"IoT Partner Quickstart", https://services.google.com/fh/files/misc/iot_partner_quickstart1.0.pdf, Nov. 15, 2018, pp. 1-13.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"Mobile Content Management", VMWare | https://www.vmware.com/content/dam/digitalmarketing/vmware/en/pdf/wrorkspace-one/vmware-airwatch-mcm-datasheet.pdf, Dec. 2019, pp. 1-4.
"Model deployment and serving", Google Cloud | https://cloud.google.com/architecture/ml-on-gcp-best-practices#model-deployment-and-serving, May 18, 2021, pp. 1.
"Neo-AI-DLR is a common runtime for machine learning models compiled by AWS SageMaker Neo, TVM, or TreeLite.", GitHub | https://github.com/neo-ai/neo-ai-dlr, Dec. 1, 2020, pp. 1-4.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"TensorFlow Lite Delegates", TensorFlow | https://www.tensorflow.org/lite/performance/delegates, Jan. 30, 2021, pp. 1-8.
"Unified Access Gateway Architecture", https://techzone.vmware.com/resource/unified-access-gateway-architecture, Nov. 2020, pp. 1-18.
"VMware Charts Course for Customers to Seize Opportunity at the Edge", VMWare News & Stories | https://news.vmware.com/releases/vmworld-2021-edge, Oct. 5, 2021, pp. 1-11.
"What is AWS IoT?", AWS | Youtube: https://www.youtube.com/watch?v=WAp6FHbhYCk&ab_channel=Amazon WebServices: Timestamp 4:55/10:08, Jan. 2018.
"What is IoT Edge?", Code Project | https://www.codeproject.com/Articles/1261285/What-is-IoT-Edge, Sep. 2018, pp. 1-9.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Chi, Chrissie , "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
MSV, Janakiram , "5 Reasons Why Azure IoT Edge Is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.
MSV, Janakiram , "Azure IoT Edge: A Technology Primer", TheNewsStack | https://thenewstack.io/azure-iot-edge-a-technology-primer/, Sep. 14, 2018, pp. 1-9.
Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.
Param, Sunil , "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.
Rhee, Injong , "Bringing intelligence to the edge with Cloud IoT", Google Cloud | https://cloud.google.com/blog/products/gcp/bringing-intelligence-edge-cloud-iot, Jul. 25, 2018, pp. 1-7.
Vanderzyden, John , "Using AWS Greengrass to Enable IoT Edge Computing", mabl | https://www.mabl.com/blog/using-aws-greengrass-enable-iot-edge-computing, Aug. 23, 2017, pp. 1-12.
Wiggers, Kyle , "Microsoft launches Azure IoT Edge out of preview", VentureBeat | https://venturebeat.com/mobile/microsoft-launches-azure-iot-edge-out-of-preview/, Jun. 27, 2018, pp. 1-6.
Yamashita, Teppei, "Real-time data processing with IzoT Core", Google Cloud | https://cloud.google.com/community/tutorials/cloud-iot-rtdp, Apr. 2018, pp. 1-19.
Zhang, Xinyi, "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
"Introducing GKE Autopilot: a revolution in managed Kubernetes", Google Cloud | https://cloud.google.com/blog/products/containers-kubernetes/introducing-gke-autopilot, Feb. 24, 2021, pp. 9.
"RedHat introduces Red Hat OpenShift Data Science", Red Hat | https://redhat.com/en/resources/omdia-openshift-data-science-analysis-material, Jun. 21, 2021, pp. 3.
"VMWare Workspace ONE Access: Feature Walk-through", YouTube | https://www.youtube.com/watch?v=LGQRUe2vKWs, Feb. 19, 2020, pp. 1.
"vSphere With Tanzu—Networking with vSphere Distributed Switch.", YouTube | https://www.youtube.com/watch?v=0pI65Kn9AKk, Sep. 16, 2020, pp. 1.
"vSphere With Tanzu Architecture", VMWare Docs | https://docs.vmware.com/en/VMWare-vSphere/7.0/vmware-vsphere with tanzu/GUID-3E4E6039-DB24-4C40-8575-5AA0EECBBEC.html, Apr. 27, 2020, pp. 4.
Benson, Mark, "Technical Introduction to VMWare Unified Access Gateway For Horizon Secure Remote Access", VMWare | https://blogs.vmware.com/euc/2015/09/what-is-vmware-unified-access-gateway-secure-remote-access.html, Sep. 9, 2015, pp. 8.
Colbert, Kit, "Technical Introduction to vSphere with Tanzu: The Fastest Way to Get Started with Kubernetes", VMWare | https://blogs.vmware.com/vsphere/2020/09/announcing-vsphere-with-tanzu.html, Sep. 15, 2020, pp. 7.
Foley, Mike, "vSphere 7—Introduction to the vSphere Pod Service", VMWare | https://blogs.vmware.com/vsphere/2020/04/vsphere-7-vsphere-pod-service.html, Apr. 9, 2020, pp. 8.
Hagoort, Niels, "vSphere 7—A Closer Look at the VM DRS Score", VMWare | https://blogs.vmware.com/vsphere/2020/05/vsphere-7-a-closer-look-at-the-vm-drs-score.html, May 21, 2020, pp. 8.
Hagoort, Niels, "vSphere 7—Assignable Hardware", VMWare | https://blogs.vmware.com/vsphere/2020/03/vsphere-7-assignable-hardware.html, Mar. 31, 2020, pp. 7.
Hagoort, Niels, "vSphere 7—Improved DRS", VMWare | https://blogs.vmware.com/vsphere/2020/03/vsphere-7-improved-drs.html, Mar. 25, 2020, pp. 8.
Handy, Alex, "Using a Citrix ADC for the OpenShift Control Plane", Red Hat | https://cloud.redhat.com/blog/using-a-citrix-adc-for-the-openshift-control-plane, Oct. 6, 2021, pp. 5.
Iyengar, Ashok, et al., "5G at the Edge", https://www.ibm.com/cloud/blog/5g-at-the-edge, Nov. 12, 2020, pp. 1-13.

(56) References Cited

OTHER PUBLICATIONS

Iyengar, Ashok, et al., "Analytics at the Edge", https://www.ibm.com/cloud/blog/analytics-at-the-edge, Jun. 8, 2020, pp. 1-13.
Iyengar, Ashok, et al., "Architecting at the Edge", https://www.ibm.com/cloud/blog/architecting-at-the-edge, Oct. 21, 2019, pp. 1-14.
Iyengar, Ashok, et al., "Architectural Decisions at the Edge", https://www.ibm.com/cloud/blog/architectural-decisions-at-the-edge, Jul. 26, 2019, pp. 1-16.
Iyengar, Ashok, et al., "Automation at the Edge", https://www.ibm.com/cloud/blog/automation-at-the-edge, Feb. 18, 2017, pp. 1-13.
Iyengar, Ashok, et al., "Cloud at the Edge", https://www.ibm.com/cloud/blog/cloud-at-the-edge, Feb. 26, 2019, pp. 1-9.
Iyengar, Ashok, et al., "DevOps at the Edge", https://www.ibm.com/cloud/blog/devops-at-the-edge, Dec. 3, 2015, pp. 1-13.
Iyengar, Ashok, et al., "GitOps at the Edge", https://www.ibm.com/cloud/blog/gitops-at-the-edge, Nov. 2, 2017, pp. 1-13.
Iyengar, Ashok, et al., "Models Deployed at the Edge", https://www.ibm.com/cloud/blog/models-deployed-at-the-edge, Mar. 30, 2020, pp. 1-17.
Iyengar, Ashok, et al., "Network Slicing at the Edge", https://www.ibm.com/cloud/blog/network-slicing-at-the-edge, Apr. 1, 2021, pp. 1-13.
Iyengar, Ashok, et al., "Policies at the Edge", https://www.ibm.com/cloud/blog/policies-at-the-edge, Jan. 22, 2020, pp. 1-13.
Iyengar, Ashok, et al., "Rounding out the Edges", https://www.ibm.com/cloud/blog/rounding-out-the-edges, May 7, 2019, pp. 1-11.
Iyengar, Ashok, et al., "Security at the Edge", https://www.ibm.com/cloud/blog/security-at-the-edge, May 12, 2020, pp. 1-17.
Lee, Brandon, "What is VMWare vSphere 7 Assignable Hardware?", https://virtualizationhowto.com/2020/06/vsphere7-what-is-vmware-vsphere-7-assignable hardware/, Jun. 25, 2020, pp. 8.
McConville, Anton, et al., "A brief history of Kubernetes, OpenShift, and IBM", IBM Developer Blog | https://developer.ibm.com/blogs/a-brief-history-of-red-hat-openshift/, Aug. 1, 2019, pp. 9.
Menezes, Alexandre, "Introduction to Security Contexts and SCCs", Red Hat | https://cloud.redhat.com/blog/introduction-to-security-contexts-and-sccs, Mar. 16, 2020, pp. 7.
Paladi, Nicolae, et al., "Domain Based Storage Protection with Secure Access Control for the Cloud", https://dl.acm.org/doi/pdf/10.1145/2600075.2600082, 2014, pp. 35-42.
Rosoff, Jared, "Project Pacific—Technical Overview", VMWare | https://blogs.vmware.com/vsphere/2019/08/project-pacific-technical-overview.html, Aug. 26, 2019, pp. 7.
Sahu, Aditya, "The Fast Lane for Data Transfer—Paravirtual RDMA(PVRDMA) Support for Native Endpoints", VMWare | https://blogs.vmware.com/vsphere/2020/10/para-virtual-rdma-support-for-native-endpoints.html, Oct. 15, 2020, pp. 7.
Seget, Vladan, "VMware vSphere 7 DRS scoring and configuration", 4sysops | https://4sysops.com/archives/vmware-vsphere-7-drs-scoring-and-configuration, Feb. 19, 2021, pp. 10.
Tamura, Yoshi, "GPUs as a sevice with Kubernetes Engine are now generally available", Google Cloud | https://cloud.google.com/blog/products/gcp/gpus-sevice-kubernetes-engine-are-now-generally-available, Jun. 19, 2018, pp. 5.
West, Michael, "vSphere With Tanzu—Getting Stared with vDs Networking Setup", VMWare | https://blogs.vmware.com/vsphere/2020/10/vsphere-with-tanz-the-fasest-way-to-deliver-kubernetes-on-vsphere.html, Oct. 8, 2020, pp. 8.
Wiggers, Steef-Jan, "Google Kubernetes Engine 1.10 Is Generally Available and Enterprise Ready", InfoQ | https://infoq.com/news/2018/06/google-kubernetes-engine-1.10-ga, Jun. 1, 2018, pp. 4.
Wiley, Craig, "Google Cloud unveils Vertex AI, one platform, every ML tool you need", Google Cloud | https://cloud.google.com/blog/products/ai/machine-learning/google-cloud-launches-vertex-ai-platform-for-mlops, May 18, 2021, pp. 5.
"Cloud, Fog and Edge Computing—What's the Difference?", https://www.winsystems.com/cloud-fog-and-edge-computing-what's-the-difference/, Dec. 4, 2017, pp. 1-10.
"IoT: Understanding the shift from cloud to edge computing", https://internetofbusiness.com/shift-from-cloud-to-edge-computing/, Aug. 14, 2018, pp. 1-9.
Ai, Yuan, et al., "Edge computing technologies for Internet of Things: a primer", Digital Communications and Networks 4 | https://doi.org.10.1016/j.dcan.2017.07.001, 2018, pp. 77-86.
O'Keefe, Megan, "Edge Computing and the Cloud-Native Ecosystem", TheNewStack | https://thenewestack.io/edge-computing-and-the-cloud-native-ecosystem/, Apr. 18, 2018, pp. 1-11.
Ren, Ju, et al., "Edge Computing for the Internet of Things", IEEE Journals & Magazine | vol. 32 Issue: 1, 2008, pp. 1-6.
Zhao, Zhuoran, et al., "DeepThings: Distributed Adaptive Deep Learning Intference on Resource-Constrained IoT Edge Clusters", IEEE Transactions on Computer-Aided Design of Integrated Circuits and Systems, vol. 37, No. 11 | doi:10.1109/TCAD.2018.2858384., Nov. 2018, pp. 2348-2359.
Harnik, Danny, et al., "Secure Access Mechanism for Cloud Storage", vol. 12, No. 3, pp. 317-336. [Retrieved from internet on Feb. 14, 2023], <https://scpe.org/index.php/scpe/article.view/727>, 2011, pp. 317-336.

* cited by examiner

COMMON SERVICES MODEL FOR MULTI-CLOUD PLATFORM

CROSS REFERENCE TO RELATED APPLICATION(S)

This application claims the benefit under 35 U.S.C. 119 of the earlier filing date of U.S. Provisional Application 63/113,614 entitled "COMMON SERVICES MODEL FOR MULTI-CLOUD PLATFORM", filed Nov. 13, 2020. The aforementioned provisional application is hereby incorporated by reference in its entirety, for any purpose.

BACKGROUND

Public and private cloud service platforms can have varying architectures, including differing sets of host operating systems or hypervisors, differing sets of offered services, differing platform-specific application programming interfaces (APIs), different data storage structures, etc. As such, a customer that has operations on multiple cloud service platforms may need to independently develop a different version of an application to accommodate differences in offered services on each cloud platform. The process of developing multiple versions of the same application to make it compatible with each desired cloud service platform can be technically complicated and time consuming, as it requires gathering an understanding the architecture of each target cloud service platform, and then developing a version of the application based on the available services. Such an undertaking may beyond the scope or expertise of many information technology (IT) departments.

DETAILED DESCRIPTION

Figure 1:
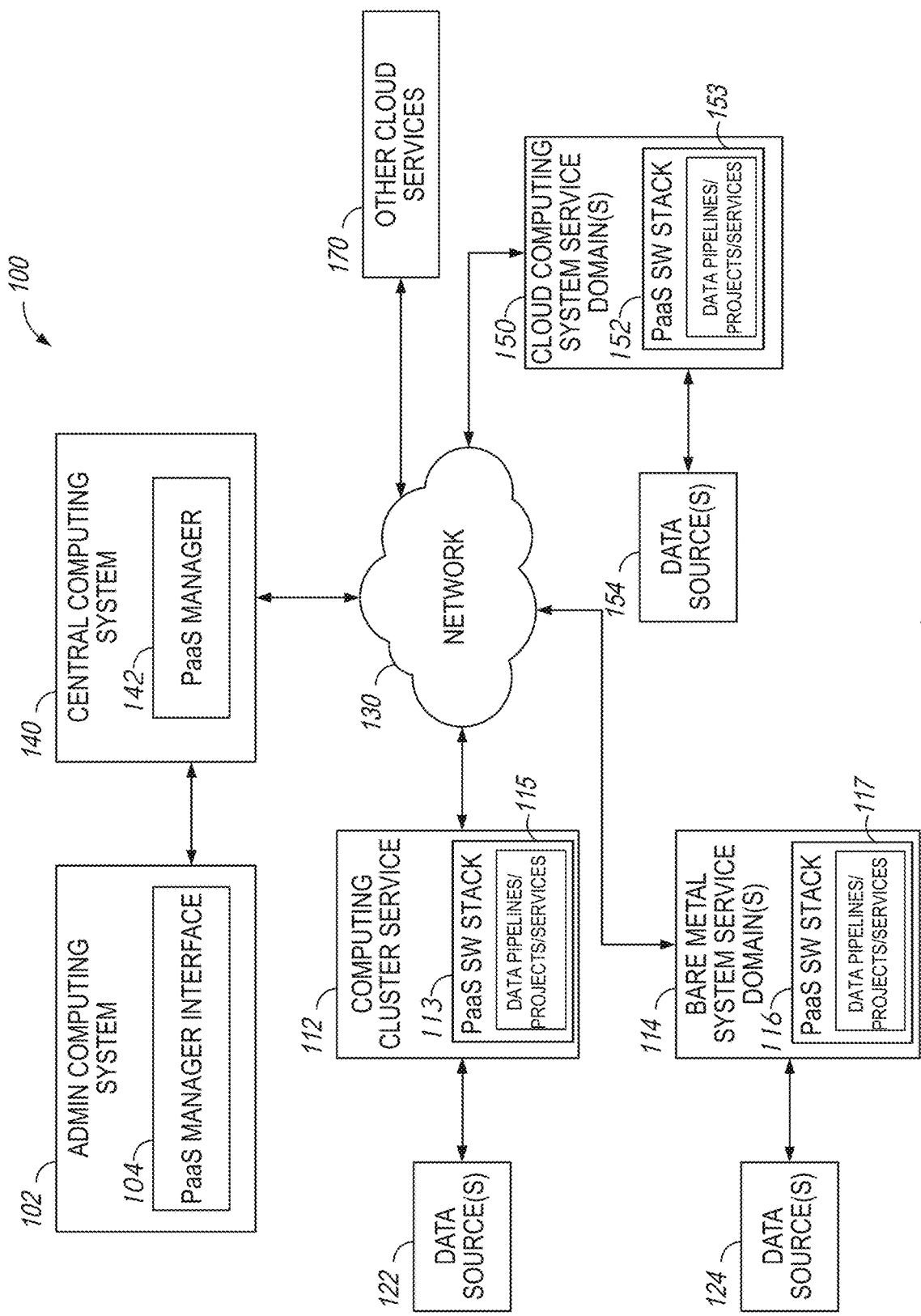
FIG. 1 is a block diagram of a multi-cloud platform as a service system, in accordance with an embodiment of the present disclosure.

Examples described herein include a PaaS infrastructure and application lifecycle manager (PaaS manager) configured to implement a common services model to deploy selected services from a common set of services to service domains hosted on multiple different cloud platforms. Generally, when an application is generated, successful execution may depend on availability of various additional supporting services, such as a read/write data services (e.g., publish/subscribe service, search services, etc.), data pipeline services, ML inference services, container management services, other runtime or data services, etc., or any combination thereof. The PaaS manager may abstract deployment of the additional supporting services, as some services may be platform-specific, as well as may manage a lifecycle of the service containers, upgrades and/or patches to the services, etc.

In some examples, the PaaS manager may include an interface to set up projects and to deploy services. In some examples, projects can span multiple service domains and can reference cloud profiles. In some examples, functionality of the PaaS manager may be distributed across multiple virtual machine or container instances each configured to manage a respective subset of service domains, projects, services, etc.

In some examples, a service can be enabled and/or disabled on a per project basis, such that a service can be used by all apps and pipelines within a project, but may not be accessible to apps and pipelines in other projects. When creating a project, a list of available services may be presented for selection. In addition, the PaaS manager may provide an interface to select/change various configuration parameters for a particular service to be deployed to one or more service domains. In some examples, services may be accessed from applications running inside a project on a service domain or by external clients. The service model may publish an application programming interface (API) endpoint for each project for which the service has been enabled. In some examples, API endpoints may be the same or may be different for different projects. Services can be exposed externally by making the API endpoint public. In some examples, a project may have multiple different endpoints in order to provide applications different types of access to a common service (e.g., read-write, read-only, write-only, etc.). In some examples, when a project is deployed across multiple service domains hosted on different computing platform architectures (e.g., different cloud computing platforms, bare metal and non-bare metal platforms, or any combination thereof), the PaaS manager may manage enabling or disabling of a common service on each of the service domains hosting the project in a manner that is transparent to a user (e.g., without user intervention to handle platform-specific differences between the different computing platform architectures).

In some examples, the PaaS manager may provide an interface to update respective configuration parameters or settings for a service. The configuration parameters or settings may be service-specific. The configuration parameters may be defined using an OpenAPI schema, in some examples. The PaaS manager may also monitor the health of services deployed to service domains, as well as may monitor other service-specific criteria. In some examples, the PaaS manager may report service-specific entities, such as a messenger service, tables in a database, etc.

In some examples, instantiation and configuration of services may have different scope. For example, one group of services may be service domain-level scope and another group of services may be project-level scope. A distinction may be based on which services are more tightly coupled with a service domain as a whole, and which are more easily separable. For example, Istio and/or artificial intelligence (AI) Inference services may be single services within a service domain, with service instances of each being shared across projects. The Istio service may be naturally set up to support a single service mesh for a Kubernetes cluster. In some examples, Istio may support multi-service meshes, as Istio may honor network boundaries between projects to support multi-tenant implementations using a single Istio control plane and service mesh. The AI Inference service may consume significant hardware resources, and as such, may be configured per service domain to avoid resource conflicts. In some examples, the AI inference service may be a compute-only service, and may be adapted to support multi-tenant implementations with resource scheduling (e.g., time sharing of GPUs, similar to CPU resource scheduling).

Data services (e.g., Kafka, Prometheus, Redis), which are non-multitenant in nature, may be instantiated per project. In addition, from a resource isolation perspective data services may provide better isolation when deployed as multiple instances.

External services may be divided into two categories based on accessibility: 1. private cloud services (e.g., accessible at specific locations); and 2. public cloud services (e.g., globally accessible across locations). Private cloud services may be coupled with service domains that correspond to the specific locations.

Service instances and their bindings are created using a service class. The service class may describe all available configuration options at time of service creation or update. A binding is created for service-domain-level scope services and a service instance is created for project or service domain-level scope services. In some examples, the binding may be project-level scope to allow applications in a project to access to a shared, service-domain level scope service. In some examples, the service-domain level scope service instances may be generated on-demand (e.g., in response to) creation of a project level scope binding for the service.

In some examples, bindings may allow different applications to have different types of access to a common service (e.g., read-write, read-only, write-only, etc.). For a particular service, both a binding and a service instance can refer back to the service class. In some examples, a service instance may accept configuration changes via the PaaS manager. In some examples, configuration parameters for a service-domain level scope service instance may be managed by applications in a corresponding project based on an expected behavior in a multi-tenant service. Configuration parameters for a project-level scope service instance may be changed to alter behavior of the service for applications in a particular project. For instance, auto-create of topics in Kafka may be enabled for a project, which may be desirable in some projects, but not others. However this setting is per-service-instance, and will affect all clients using that service instance. In some examples, bindings can be useful when different applications in the same project require different access or when some applications are external, such that a same service may have more than one different binding to a project with different configuration parameters.

Thus, a user may provide information directed to an application to be deployed to the PaaS manager and identify one or more target service domains, and the PaaS manager may deploy respective application bundle for each of the one or more target service domains that includes the application and/or the additional supporting services. In some examples, the supporting services may already be hosted on the service domain, which may preclude the necessity of including those services in the application bundle. The PaaS manager may deploy the respective application bundle to the corresponding one of the one or more identified target service domains. The ability of the PaaS manager to abstract platform-specific details for creating and deploying a service domain and deploying an application bundle to run in a service domain may make deployment of applications to different service domains and across different computing platforms more efficient for a user. This may allow a customer to operate in a hybrid of various different computing platform types in a way that differences between the various computing platform types is transparent to an end customer. The ability to deploy applications across different computing platforms may allow for more flexible multi-cloud and/or multi-platform data integration for a customer. The PaaS manager may be hosted in a cloud computing system (e.g., public or private) and/or may be delivered/distributed using a software as a service (SaaS) model, in some examples.

The PaaS manager may be configured to deploy service domains, services, projects, and applications on one or more different types of computing platforms. The PaaS manager is also configured to build and deploy different types of applications to the service domains. An application may include a data pipeline, a container, a data service, a machine learning (ML) model, etc., or any combination thereof. A user may elect to deploy an application to a type of platform based on various criteria, such as type of service, proximity to source data, available computing resources (e.g., both type and available capacity), platform cost, etc., or any combination thereof. Types of platforms may include a cloud platform (e.g., Nutanix®, Amazon® Web Services (AWS®), Google® Cloud Platform, Microsoft® Azure®, etc.), a computing node cluster, a bare metal platform (e.g., platform where software is installed directly on the hardware, rather than being hosted in an operating system), an IoT platform (e.g., edge systems, etc.).

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of a multi-cloud platform as a service system 100, in accordance with an embodiment of the present disclosure. The system 100 may include one or more of any of computing cluster service domain(s) 112 coupled to respective data source(s) 122, bare metal system service domain(s) 114 coupled to respective data source(s) 124, and the cloud computing system service domain(s) 150 coupled to respective data source(s) 154. The system 100 may further include a central computing system 140 coupled to the one or more of the computing cluster service domain(s) 112, the bare metal system service domain(s) 114, and/or the cloud computing system service domain(s) 150 via a network 130 to manage communication within the system 100.

The network 130 may include any type of network capable of routing data transmissions from one network device (e.g., of the computing cluster service domain(s) 112, the bare metal system service domain(s) 114, the central computing system 140, and/or the cloud computing system service domain(s) 150) to another. For example, the network 130 may include a local area network (LAN), wide area network (WAN), intranet, or a combination thereof. The network 130 may include a wired network, a wireless network, or a combination thereof.

Each of the computing cluster service domain(s) 112 may be hosted on a respective computing cluster platform having multiple computing nodes (e.g., each with one or more processor units, volatile and/or non-volatile memory, communication or networking hardware, input/output devices, or any combination thereof) and may be configured to host a respective PaaS software stack 113. Each of the bare metal system service domain(s) 114 may be hosted on a respective bare metal computing platform (e.g., each with one or more processor units, volatile and/or non-volatile memory, communication or networking hardware, input/output devices, or any combination thereof) and may be configured to host a respective PaaS software stack 116. Each of the cloud computing system service domain(s) 150 may be hosted on a respective public or private cloud computing platform (e.g., each including one or more data centers with a plurality of computing nodes or servers having processor units, volatile and/or non-volatile memory, communication or networking hardware, input/output devices, or any combination thereof) and may be configured to host a respective PaaS software stack 152. "Computing platform" referred to herein may include any one or more of a computing cluster platform, a bare metal system platform, or a cloud-computing platform. "Service domain" used herein may refer to any of the computing cluster service domain(s) 112, the bare metal system service domain(s) 114, or the cloud computing system service domain(s) 150. The PaaS software stacks (e.g., any of the PaaS software stack, the PaaS software stack PaaS software stack 113, PaaS software stack 116, and/or PaaS software stack 152) may include platform-specific software configured to operate on the respective system. The software may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein.

The data source(s) 122, 124, and 154 may each include one or more devices or repositories configured to receive, store, provide, generate, etc., respective source data. The data sources may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, a data lake (e.g., a large capacity data storage system that holds raw data) or any other source of data consumed, retrieved, stored, or generated by the service domains. The service domain construct may allow a customer to deploy applications to locations proximate relevant data, in some examples. In some examples, the service domain construct may allow a customer to deploy applications to computing platforms that have a particular computing resource (e.g., hardware or software configuration) and/or based on computing resource capacity.

In some examples, various components of the system 100 may need access to other cloud services 170. To facilitate communication with the other cloud services 170, the data pipelines of the PaaS software stacks may be configured to provide interfaces between projects, applications, and services hosted on one or more of the service domains 112, 114, or 150 and the other cloud services 170 via the network 130. In some examples, the PaaS software stacks 113, 116, and/or 152, may each be configured to host respective data pipeline(s), projects, and/or services 115, 117, and/or 153. The data pipelines may be configured to provide data from the other cloud services 170 to applications hosted on one or more of the service domains 112, 114, or 150 to aggregate, transform, store, analyze, etc., the data.

Each of the PaaS software stacks may include one or more applications, data pipelines, ML models, containers, data services, etc., or any combination thereof (e.g., applications). The applications may be configured to receive, process/transform, and output data from and to other applications. The applications may be configured to process respective received data based on respective algorithms or functions to provide transformed data. At least some of the applications may be dependent on availability of supporting services to execute, such as communication services, runtime services, read-write data services, ML inference services, container management services, etc., or any combination thereof.

The data pipeline(s) 115, 117, and/or 153 may provide a conduit through which data can be passed (e.g., provided and/or received) between applications hosted in the PaaS Software stack, as well as a conduit through which data can be passed among the different service domains or to the other cloud services 170 via the network 130. Generally, a data pipeline of the data pipeline(s) 115, 117, and/or 153 may include an input component to receive data from another data pipeline, any data source, or other service domain or cloud service 170 (via the network 130); an output component to provide data to another data pipeline, any data source, or other service domain or cloud service 170 (via the network 130); and at least one transform component configured to manipulate the input data to provide the output data.

The data pipeline(s) 115, 117, and/or 153 can be constructed using computing primitives and building blocks, such as VMs, containers, processes, or any combination thereof. In some examples, the data pipeline(s) 115, 117, and/or 153 may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls.

In some examples, the PaaS system 100 may be configured to implement a common services model to deploy selected services from a common set of services to service domains hosted on multiple different cloud platforms. Generally, when an application is generated, successful execution may depend on availability of various additional supporting services, such as a read/write data services (e.g., publish/subscribe service, search services, etc.), data pipeline services, ML inference services, container management services, other runtime or data services, etc., or any combination thereof. The PaaS manager 142 may abstract deployment of the additional supporting services, as some services may be platform-specific, as well as may manage a lifecycle of the service containers, upgrades and/or patches to the services, etc. In some examples, functionality of the PaaS manager 142 may be distributed across multiple virtual machine or container instances each configured to manage a respective subset of service domains, projects, services, etc.

In some examples, the PaaS manager interface 104 may include an interface to set up projects and to deploy services to service domains of the various PaaS software stacks 113, 116, 152. In some examples, projects can span multiple service domains and can reference cloud profiles.

In some examples, a service can be enabled and/or disabled on a per project basis, such that a service can be used by all apps and pipelines within a project, but may not be accessible to apps and pipelines in other projects. When creating a project, a list of available services may be presented for selection. In addition, the PaaS manager 142 may provide an interface to select/change various configuration parameters for a particular service to be deployed to one or more service domains. In some examples, services may be accessed from applications running inside a project on a service domain or by external clients. The service model may publish an application programming interface (API) endpoint for each project for which the service has been enabled. In some examples, API endpoints may be the same or may be different for different projects. Services can be exposed externally by making the API endpoint public. In some examples, a project may have multiple different endpoints in order to provide different applications different to have types of access to a common service (e.g., read-write, read-only, write-only, etc.). The multiple endpoints may be created using multiple different bindings (e.g., the binding may generate the endpoint and credentials for an application to access a service). In some examples, when a project is deployed across multiple service domains hosted on different computing platform architectures (e.g., computing cluster service domain(s) 112, bare metal system service domain(s) 114, and the cloud computing system service domain(s) 150, or any combination thereof), the PaaS manager 142 may manage enabling or disabling of a common service on each of the service domains hosting the project in a manner that is transparent to a user (e.g., without user intervention to handle platform-specific differences between the different computing platform architectures).

In some examples, the PaaS manager 142 may provide an interface to update respective configuration parameters or settings for a service. The configuration parameters or settings may be service-specific. The configuration parameters may be defined using an OpenAPI schema, in some examples. The PaaS manager 142 may also monitor the health of services deployed to service domains, as well as may monitor other service-specific criteria.

In some examples, instantiation and configuration of services may have different scope. For example, one group of services may be service domain-level scope and another group of services may be project-level scope. A distinction may be based on which services are more tightly coupled with a service domain as a whole, and which are more easily separable. For example, a service mesh (e.g., Istio) and/or artificial intelligence (AI) Inference services may be single services within a service domain, with service instances of each being shared across projects. In a specific example, the Istio service mesh is naturally set up to support a single service mesh for a Kubernetes cluster, so scoping the service mesh to a service domain (e.g., Kubernetes cluster counterpart) may allow multiple service meshes. Typically, the AI Inference service may consume significant hardware resources that sometimes cannot be shared across projects (e.g., graphics processor unit resources), and as such, may be configured per service domain to avoid resource conflicts.

Data services (e.g., Kafka, Prometheus, Redis), which are non-multitenant in nature, may be instantiated per project. In addition, from a resource isolation perspective data services may provide better isolation when deployed as multiple instances.

External services may be divided into two categories based on accessibility: 1. private cloud services (e.g., accessible at specific locations); and 2. public cloud services (e.g., globally accessible across locations). Private cloud services may be coupled with service domains that correspond to the specific locations.

Service instances and their bindings may be created using a service class. The service class may describe all available configuration options at time of service creation or update. A binding is created for project-level scope services and a service instance is created for service domain-level scope services. In some examples, the service instance may be project-level scope, too. In some examples, bindings may allow different applications to have different types of access to a common service (e.g., read-write, read-only, write-only, etc.). For a particular service, both a binding and a service instance can refer back to the service class. In some examples, only a service instance in the service domain context may accept configuration changes via the PaaS manager 142. In some examples, bindings can be useful when different applications in the same project require different access or when some applications are external, such that a same service may have more than one different binding to a project with different configuration parameters.

In some examples, the respective ML inference services may be configured to load and execute respective ML model applications. Thus, the ML inference services may be configured to receive a request for an inference or prediction using a ML model, and to load a ML model application that includes the requested ML model into an inference engine. The inference engine may be configured to select a runtime based on a hardware configuration of the edge system, and execute the ML model on input data to provide inference or prediction data. The inference engine may be configured to optimize the ML model for execution based on a hardware configuration. The ML inference service may provide the benefits of GPU abstraction, built-in frameworks for ML model execution, decoupling application development from hardware deployment, etc. In some examples, the PaaS manager 142 may be configured to access data from one or more data lakes (e.g., via the data sources 122, 124, 154), transform the data from the one or more data lakes, train a ML model using the transformed data, and generate an ML model application based on the trained ML model.

The one or more applications of the PaaS software stacks may be implemented using a containerized architecture that is managed via a container orchestrator. The container orchestration managed by a PaaS infrastructure and application lifecycle manager (PaaS manager) 142 under the service domain construct may handle (e.g., using middleware) underlying details of the PaaS related to containerized management complexity, orchestration, security, and isolation, thereby make it easier for a customer or user to focus on managing the applications. The management may be scalable via categories. In some examples, the service domains may be configured to support multi-tenant implementations, such that data is kept securely isolated between tenants. The applications communicate using application programming interface (API) calls, in some examples. In some examples, the supporting services may also be implemented in the containerized architecture.

The PaaS manager 142 hosted on the central computing system 140 may be configured to centrally manage the PaaS infrastructure (e.g., including the service domains) and manage lifecycles of deployed applications. The central computing system 140 may include one or more computing nodes configured to host the PaaS manager 142. The central computing system 140 may include a cloud computing system and the PaaS manager 142 may be hosted in the cloud computing system and/or may be delivered/distributed using a software as a service (SaaS) model, in some examples. In some examples, the PaaS manager 142 may be distributed across a cluster of computing nodes of the central computing system 140.

In some examples, an administrative computing system 102 may be configured to host a PaaS manager interface 104. The PaaS manager interface 104 may be configured to facilitate user or customer communication with the PaaS manager 142 to control operation of the PaaS manager 142. The PaaS manager interface 104 may include a graphical user interface (GUI), APIs, command line tools, etc., that are each configured to facilitate interaction between a user and the PaaS manager 142. The PaaS manager interface 104 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the PaaS manager 142 may be configured to manage, for each of the computing platforms, creation and deployment of service domains, creation and deployment of application bundles to the PaaS software stacks, etc. For example, the PaaS manager 142 may be configured to create and deploy service domains on one or more of the computing platforms. The computing platforms may include different hardware and software architectures that may be leveraged to create and deploy a service domain. Thus, the PaaS manager 142 may be configured to manage detailed steps associated with generating a service domain in response to a received request.

The PaaS manager 142 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The PaaS manager 142 may abstract deployment of the additional supporting services, as some of these may be platform-specific, using a common services model. A user may provide information directed to an application to be deployed to the PaaS manager 142 and identify one or more target service domains, and the PaaS manager 142 may deploy the application to the target service domains. The target service domains provide services to be used by the application, and accordingly, the application need not include services provided by the service domain. Moreover, the application need not take platform-specific actions which may be typically required for starting those services. The PaaS manager 142 may deploy the respective application to the corresponding one of the one or more identified target service domains.

The ability of the PaaS manager 142 to abstract platform-specific details for creating and deploying a service domain, services, projects, and/or applications makes it more efficient for users to deploy across a wider selection of cloud computing platforms than would otherwise be considered. Thus, the service domain construct may allow a customer to focus on core concerns with an application, while shifting consideration of supporting services to the PaaS manager 142 and the service domains. The service domain construct may also make applications more "light weight" and modular for more efficient deployment to different service domains. The PaaS manager interface 104 may provide a GUI interface.

The PaaS manager 142 may be configured to generate (e.g., build, construct, update, etc.) and distribute the applications to selected service domains based on the platform-specific architectures of the computing platforms. In some examples, the PaaS manager 142 may facilitate creation of one or more application constructs and may facilitate association of a respective one or more service domains with a particular application construct (e.g., in response to user input).

For example, in response to a request for deployment of a new application, the PaaS manager 142 may determine whether the new application is properly configured to run in a target service domain. The PaaS manager 142 may ensure that service dependencies for the new application are met in the service domains, in some examples, such as deployment of supporting services for the application to a target service domain.

In operation, the system 100 may include any number and combination of computing platforms that may collectively span any type of geographic area (e.g., across continents, countries, states, cities, counties, facilities, buildings, floors, rooms, systems, units, or any combination thereof). The computing platforms within the system 100 may include a wide array of hardware and software architectures and capabilities. Each of the computing platforms may host respective software stacks that include various applications that are configured to receive, process, and/or transmit/store data from one or more of the connected data sources 120 and/or from other applications. The service domain architecture may allow formation of a hybrid cloud-computing platform where applications and data can be moved across different computing platforms.

Each of the applications may be configured to process data using respective algorithms or functions, and well as leveraging respective supporting services. In some examples, the algorithms or functions may include any other user-specified or defined function to process/transform/select/etc. received data. The supporting services may include runtime services, read/write data services, communication services, ML inference services, search services, etc., or any combination thereof. In some examples, the service domain for a respective computing platform may be configured to share data with other service domains. The one or more applications of the PaaS software stacks may be implemented using a containerized architecture that is managed via a container orchestrator. The applications may communicate using application programming interface (API) calls, in some examples.

The PaaS manager 142 may be configured to generate or update service domains to host the PaaS software stacks on the computing platforms. The service domains may include deployment of one or more virtual machines or other construct configured to host the respective PaaS software stack. The service domain may identify computing resource types and allocation.

Figure 2:
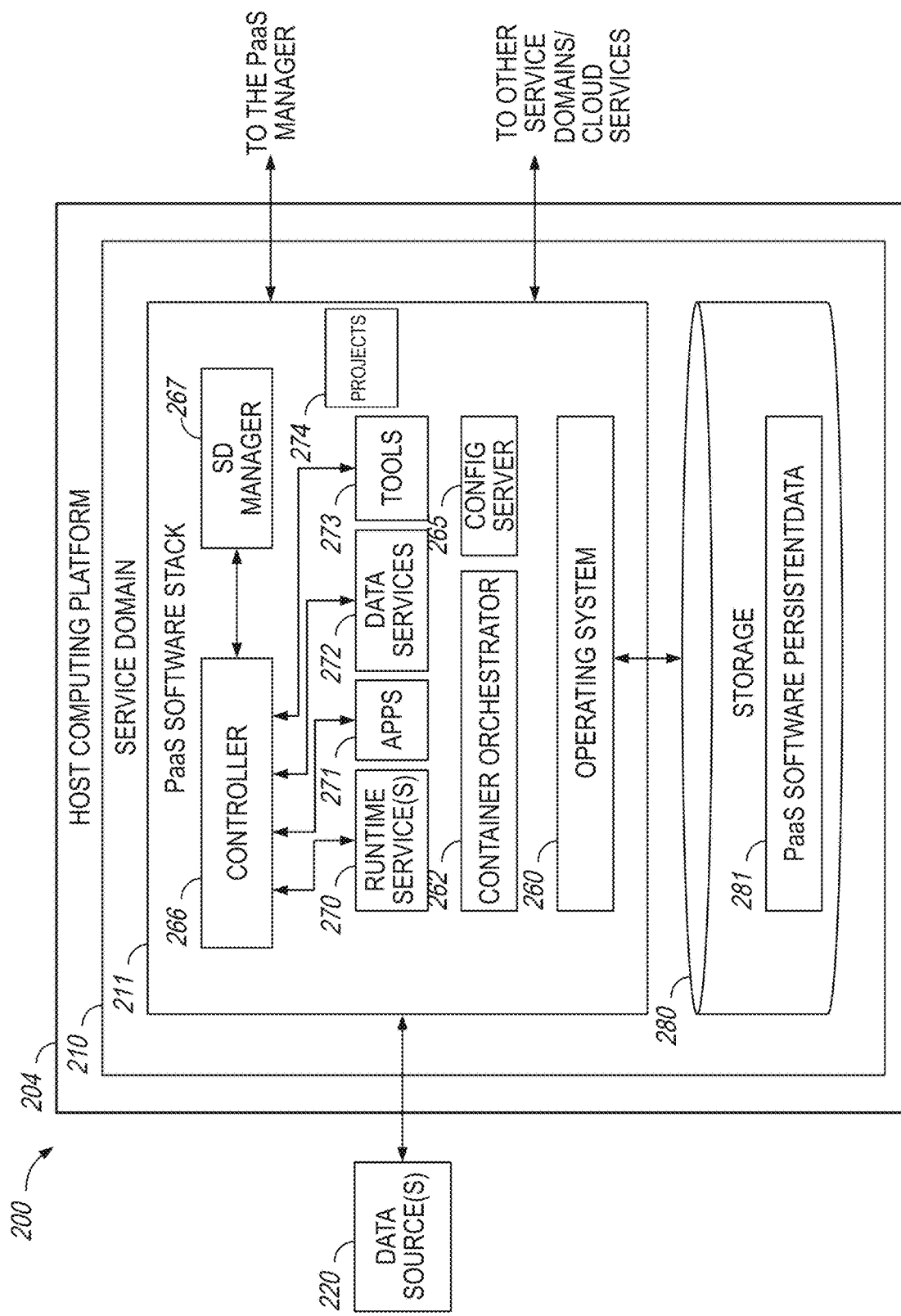
FIG. 2 is a block diagram of a Service Domain, in accordance with an embodiment of the present disclosure.

The PaaS manager 142 may be further configured to deploy applications to the PaaS software stacks, as well as supporting services for execution of the application. A user may elect to deploy an application to a type of platform based on various criteria, such as type of service, proximity to source data, available computing resources (e.g., both type and available capacity), platform cost, etc., or any combination thereof. When an application is generated, successful execution may depend on availability of various additional supporting services, such as a read/write data services (e.g., publish/subscribe service, search services, etc.), ML inference services, container management services, runtime services, etc., or any combination thereof. The PaaS manager 142 may abstract deployment of the additional supporting services, as some of these may be platform-specific. Thus, a user may provide information directed to an application to be deployed to the PaaS manager 142 and identify one or more target service domains, and the PaaS manager 142 may deploy a respective application bundle to each of the one or more target service domains, along with a bundle of additional supporting services required for execution of the application. bundle FIG. 2 is a block diagram of a computing system 200, in accordance with an embodiment of the present disclosure. The computing system 200 may include a host computing platform 204 configured to host a service domain 210. The service domain 210 may be configured to host a PaaS software stack 211 and storage 280. The host computing platform 204 may include any of a computing cluster platform, a bare metal system platform, a server, a public or private cloud computing platform, an edge system, or any other computing platform capable of hosting the 210. Any of the computing cluster service domain(s) 112, the bare metal system service domain(s) 114, and/or the cloud computing system service domain(s) 150 of FIG. 1 may implement a respective version of the service domain 210. Any of the PaaS software stack 113, the PaaS software stack 116, and/or PaaS software stack 152 of FIG. 1 may implement some or all of the PaaS software stack 211.

In some examples, the service domain 210 may be configured to host a respective PaaS software stack 211. In some examples, the service domain 210 may include a VM hosted on the host computing platform 204.

The storage 280 may be configured to store PaaS software persistent data 281, such as software images, binaries and libraries, metadata, etc., to be used by the service domain 210 to load and execute the PaaS software stack 211. In some examples, the PaaS software persistent data 281 includes instructions that when executed by a processor of the service domain 210, causes the PaaS software stack 211 to perform functions described herein. The storage may include local storage (solid state drives (SSDs), hard disk drives (HDDs), flash or other non-volatile memory, volatile memory, or any combination thereof), cloud storage, networked storage, or any combination thereof.

The PaaS software stack 211 includes a bundle hosted on a physical layer of the service domain 210 to facilitate communication with one or more data source(s) 220 (e.g., internal or external to the system 200), other service domains and/or computing platforms and/or a PaaS infrastructure and application lifecycle manager (e.g., the PaaS manager 142 of FIG. 1). The data source(s) 220 may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, or any other source of data consumed, retrieved, stored, or generated by the service domains.

The PaaS software stack 211 may host an underlying operating system 260 configured to interface the physical layer of the service domain 210. In some examples, a controller 266, a service domain manager 267, a container orchestrator 262, and a configuration server 265 may run on the operating system 260. In some examples, the PaaS software stack 211 may include a bare metal implementation that runs the operating system 260 directly on the physical layer. In other examples, the PaaS software stack 211 may include a virtualized implementation with a hypervisor running on the physical layer and the operating system 260 running on the hypervisor.

The container orchestrator 262 may be configured to manage a containerized architecture of one or more of runtime services 270, applications 271, data services 272, and/or tools 273), projects 274. In some examples, the container orchestrator 262 may include Kubernetes® container orchestration software. The runtime services 272 may include containers, functions, machine learning, AI inferencing, data pipelines, or any combination thereof. The data services may include publish/subscribe services, file system storage, databases, block storage, object storage, or any combination thereof. The tools 273 may include real-time monitoring tools, debugging tools, logging tools, alerting tools, or any combination thereof. The applications 271 may include any executable application configured to run in the PaaS software stack 211.

The service domain manager 267 may communicate with the PaaS manager to receive projects 274, applications 271, and common supporting services (e.g., including the runtime services 270, the data services 272, and/or the tools 273), as well as data source connectivity information, etc. In some examples, the service domain manager 267 may also be configured to provide configuration and status information to a centralized PaaS manager, including status information associated with one or more of the data source(s) 220.

In response to information received from the PaaS manager, the service domain manager 267 may be configured to provide instructions to the controller 266 to manage the runtime services 270, the applications 271, the data services 272, and/or the tools 273 supported by the service domain 210, which may include causing installation or upgrading of one of the runtime services 270, the applications 271, the data services 272, and/or the tools 273; removing one of the runtime services 270, the applications 271, the data services 272, and/or the tools 273; starting or stopping new instances of the runtime services 270, the applications 271, the data services 272, and/or the tools 273; allocating service domains to host the PaaS software stack 211; or any combination thereof. The PaaS software persistent data 281 may include application data that includes data specific to the respective application to facilitate execution, including supporting services.

As previously described, the runtime services 270, the applications 271, the data services 272, and/or the tools 273 may be implemented using a containerized architecture to receive source data from one or more of the data source(s) 220 (e.g., or from applications) and to provide respective transformed data at an output by applying a respective function or algorithm to the received source data. In some examples, the applications may include any user-specified or defined function or algorithm.

In some examples, the runtime services 270 may include data pipelines (e.g., the data pipeline(s) 115, 117, and/or 153 of FIG. 1) that are constructed using a group of containers (e.g., a pod) that each perform various functions within the data pipeline runtime services 270, the applications 271, the data services 272, and/or the tools 273, such as subscriber, data processor, publisher, connectors that transform data for consumption by another container within the application or pod, etc.). In some examples, the definition of stages of a constructed data pipeline may be described using a user interface or REST API, with data ingestion and movement handled by connector components built into the data pipeline. Thus, data may be passed between containers of a data pipeline using API calls.

In some examples, the data pipelines may provide a conduit through which data can be passed (e.g., provided and/or received) between applications hosted in the PaaS Software stack, as well as a conduit through which data can be passed among different service domains or to other cloud services (e.g., via a network). Generally, a data pipelines may include an input component to receive data from another data pipeline, any data source, or other service domain or cloud service; an output component to provide data to another data pipeline, any data source, or other service domain or cloud service; and at least one transform component configured to manipulate the input data to provide the output data.

In operation, the PaaS software stack 211 hosted on the service domain 210 may control operation of the service domain 210 within an IoT system to facilitate communication with one or more data source(s) 220. The service domain manager 267 of the PaaS software stack 211 may communicate with the PaaS manager to receive allocation of a service domain to host the PaaS software stack 211 and receive projects, applications 271, and common supporting services (e.g., including the runtime services 270, the data services 272, and/or the tools 273) for installation on the PaaS software stack 211. In response to information received from the PaaS manager, the service domain manager 267 may be configured to provide instructions to the controller 266 to manage the application bundles, which may include causing installation or upgrading of one of the application bundles; removing one of the application bundles; starting or stopping new instances of the application bundles, allocating hardware resources to the PaaS software stack 211 as part of the service domain, storing data in and/or retrieving data from the PaaS software persistent data 281, or any combination thereof. In some examples, certain ones of the applications or common supporting services may be made available to on a project basis. Some of the common supporting services may be bound to the project or may be instantiate in the project based on a scope of the common service The applications 271, the data services 272, and/or the tools 273 may receive source data from one or more of the data source(s) 220 (e.g., or from other applications) and to provide respective transformed data at an output by applying a respective function or algorithm to the received source data. The runtime services 270 may be leveraged by data pipelines to execute functions, in some examples. In some examples, the respective algorithms or functions may include machine learning (ML) or artificial intelligence (AI) algorithms. In some examples, the applications may cause the received and/or processed source data to be provided to other service domains via the configuration server 265. In some examples, the applications may be implemented using a containerized architecture deployed and managed by the container orchestrator 262. Thus, the container orchestrator 262 may deploy, start, stop, and manage communication with the runtime services 270, the applications 271, the data services 272, and/or the tools 273 within the PaaS software stack 211.

Figure 3:
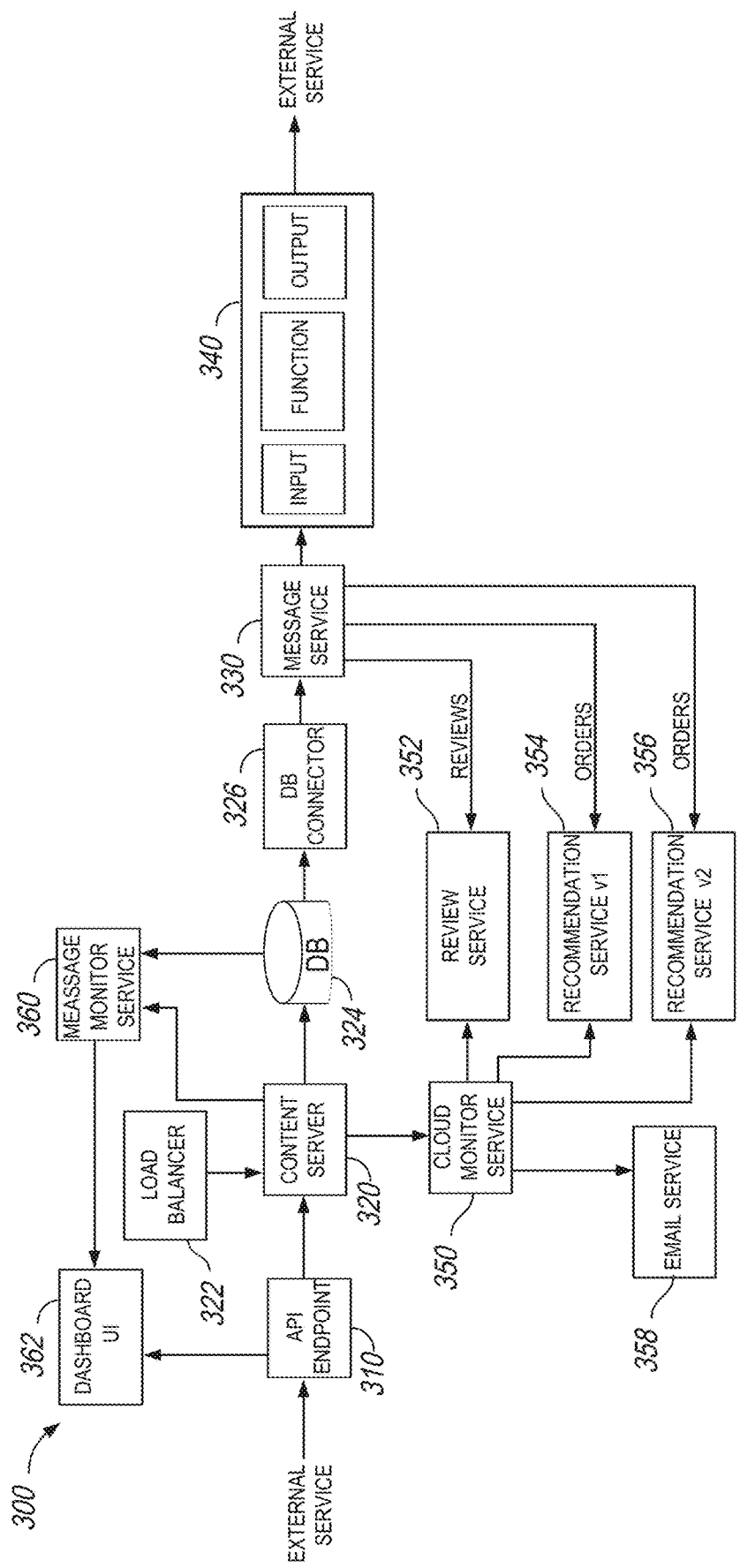
FIG. 3 includes a block diagram of an example common services model architecture 300, in accordance with embodiments of the present disclosure.

FIG. 3 includes a block diagram of an example common services model architecture 300, in accordance with embodiments of the present disclosure. An example common services model architecture 300 shown in FIG. 3 may include an API endpoint 310, a content server 320, an ingress service 322, a database 324, a database connector 326, a message service 330, a data pipeline 340, a cloud monitor service 350, and one or more various applications, such as a review service 352, a version 1 recommendation service 354, a version 2 recommendation service 356, an email service 358, a message monitor service 360, and a dashboard user interface 362. In some examples, the API endpoint 310, the message service 330, the data pipeline 340, the cloud monitor service 350, and the message monitor service 360 may be managed locally, while the other components may be managed in a private or public cloud. In some examples, the API endpoint 310, the message service 330, the data pipeline 340, the cloud monitor service 350, and the message monitor service 360 may be managed at a service domain level scope, while the other components may be managed at a project level scope. Different instances may be generated per project for components managed at the project level scope, in some examples. Instances of components managed at the service domain scope may be shared across projects, in some examples.

The API endpoint 310 may receive calls requests for information regarding available services for certain activities (e.g., messaging, database, networking, metrics, etc.) or based on scope (e.g., service domain level scope, project-level scope, etc.) on the common services model architecture 300, requests for access to certain services managed by the common services model architecture 300, requests to develop template applications for deployment of the service domains, requests to identify on which service domains to deploy applications, requests to move applications from one service domain to another, requests to remove an application from a service domain, requests to update an application, service domain, or PaaS software stack (e.g., add or remove available services, update deployed services, etc.), or any combination thereof. The API endpoint 310 may route received requests to a content server 320 for processing. The API endpoint 310 may also provide data regarding received and processed communications to a dashboard user interface 362.

The content server 320 may receive requests from the API endpoint 310 and may process the requests according to loads generated by the load balancer 322. Based on the information from the load balancer 322 and/or the API endpoint 310, the content server 320 may provide access queries to retrieve information from or update information stored at the database 324 and may provide requests information to the cloud monitor service 350. The database 324 may provide information responsive to the queries from the content server 320 to the message service 330 via a database connector 326.

The message service 330 may generate messages to be provided to consumers, such as the data pipeline 340. The cloud monitor service 350 may monitor cloud performance based on information from the content server 320, and may provide information and alerts to the review service 352, the version 1 recommendation service 354, the version 2 recommendation service 356, and the email service 358. Access to either of the version 1 recommendation service 354 or the version 2 recommendation service 356 may be facilitated by a service mesh. A service mesh, unlike other services may not be called by application business logic via an API endpoint. Instead, the service mesh may intercept network requests between applications, and route the requests to the target service. A service mesh may be deployed as a privileged service at the service-domain-level scope. The review service 352 may perform reviews of requests provided from the content server 320 and information from the database 324 to determine whether the requested information is correct and/or whether the requesting service has appropriate permissions. The version 1 recommendation service 354 and the version 2 recommendation service 356 may be configured to determine recommendations for received orders, such as determining which service to provide access to in response to an order received at the API endpoint 310.

The data pipeline 340 may include an input component to receive a message from the message service 330, a function component to process the message, data to provide output data, and an output component to provide an interface for provision of the output data to an external service or application. The output data may include a list of available services, service domains, projects, etc., responsive to a query, access information for a requested service, etc.

The message monitor service 360 may be configured to monitor activity of the content server 320 and the database 324, and may provide information and alerts regarding the activity to the dashboard user interface 362 for presentation to an administrative user.

The API endpoint 310 and the dashboard user interface 362 may be configured to facilitate user or customer communication with the common services model architecture 300 to control operation of the common services model architecture 300. The API endpoint 310 and/or the dashboard user interface 362 may include a graphical user interface (GUI), APIs, command line tools, etc., that are each configured to facilitate interaction between a user and the common services model architecture 300. The PaaS manager interface 104 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the common services model architecture 300 may be configured to manage, for each connected external service or computing platforms, creation and deployment of service domains, creation and deployment of application bundles to the PaaS software stacks, etc. For example, the common services model architecture 300 may be configured to create and deploy service domains on one or more of computing platforms. The computing platforms may include different hardware and software architectures that may be leveraged to create and deploy a service domain. Thus, the common services model architecture 300 may be configured to manage detailed steps associated with generating a service domain in response to a received request.

The common services model architecture 300 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The common services model architecture 300 may abstract deployment of the additional supporting services, as some of these may be platform-specific, using a common services model. A user may provide information directed to an application to be deployed to the common services model architecture 300 and identify one or more target service domains, and the common services model architecture 300 may deploy the application to the target service domains. The target service domains provide services to be used by the application, and accordingly, the application need not include services provided by the service domain. Moreover, the application need not take platform-specific actions which may be typically required for starting those services. The common services model architecture 300 may deploy the respective application to the corresponding one of the one or more identified target service domains.

The ability of the common services model architecture 300 to abstract platform-specific details for creating and deploying a service domain, services, projects, and/or applications makes it more efficient for users to deploy across a wider selection of cloud computing platforms than would otherwise be considered. Thus, the service domain construct may allow a customer to focus on core concerns with an application, while shifting consideration of supporting services to the common services model architecture 300 and the service domains.

Figure 4:
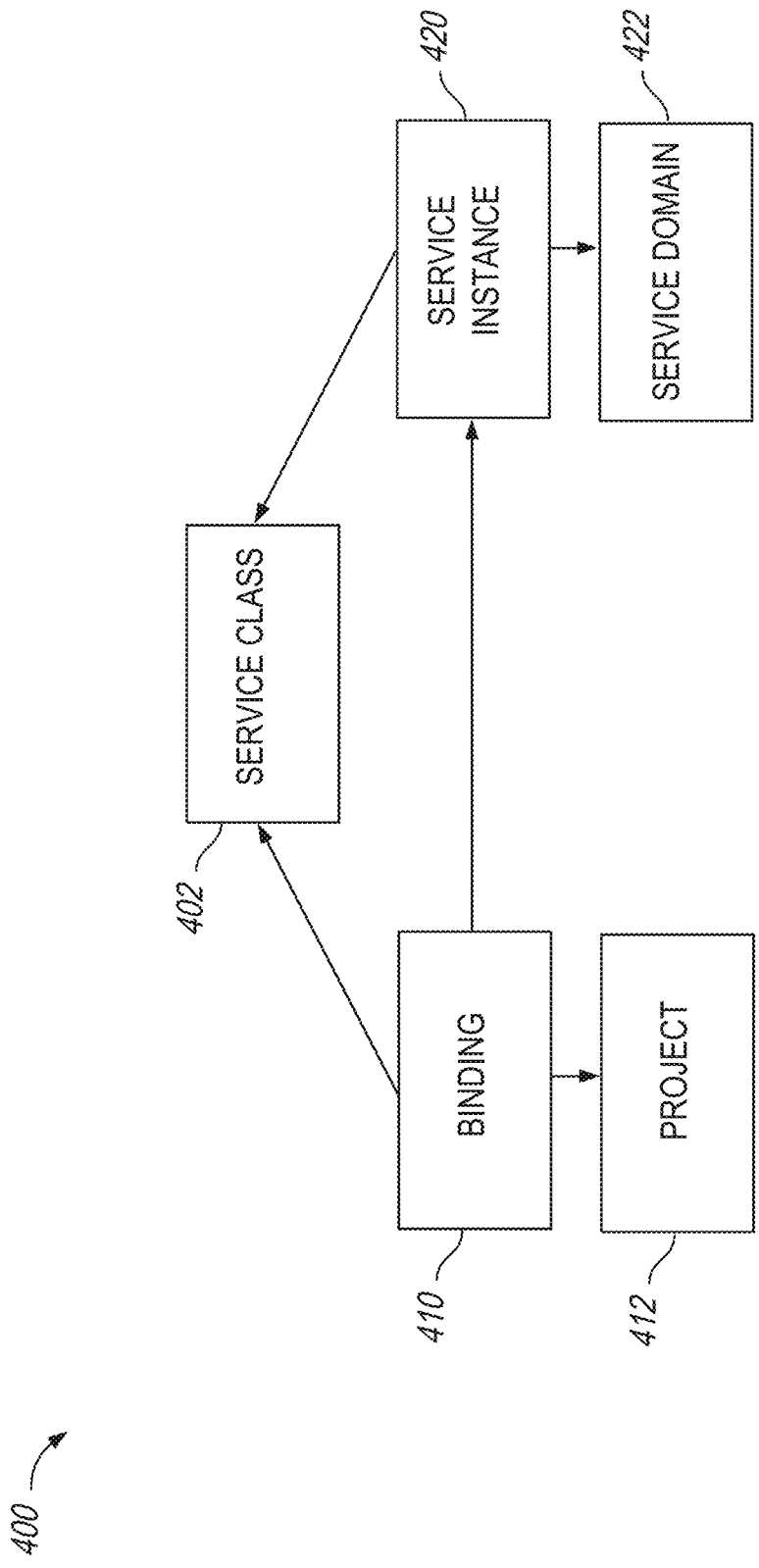
FIG. 4 depicts a relational block diagram depicting relationships between a service class, bindings, services instances, projects, and service domains, in accordance with embodiments of the present disclosure.

FIG. 4 depicts a relational block diagram depicting relationships 400 between a service class 402, binding(s) 410, services instance(s) 420, project(s) 412, and service domain(s) 422, in accordance with embodiments of the present disclosure. In some examples, binding(s) 410 may be useful when different applications in the same project require different access or when some applications are external, such that a same service may have more than one different binding to a project with different configuration parameters.

The bindings API endpoint 310 may be in the project scope and the service instances content server 320 may be in the service domain scope. Both may be instantiated from a service template. The service class 402 may describe all available configuration options at time of service creation or update. Both the bindings 410 and the service instances 420 may refer back to the same service class 402. Thus, the line between the bindings 410 and the service instances 420 may illustrate a relationship between the two since both refer to a common service class 402. The service instance 420 in the service domain 422 context may accept configuration in key or multi-value properties (MVPs) in some examples (e.g., as defined in an OpenAPI or other specification). The bindings 410 may only enable a service in project 412 context. Project scope service instances 420 may have optional binding 410 since the service instance itself is project-scoped. The service instance 420 itself may provide some or all necessary information on how to access the service within the project 412. In this example, the binding 410 is project scoped just like the service instance. The line between the service instance 420 and the binding 410 is implicit for examples where the binding 410 is providing access to a service-domain level scope service instance 420. Because a service-domain level scope service instance 420 is limited to a single instance, all bindings 410 using the service instance 420 may only refer to the service-domain level scope service instance 420

Figure 5:
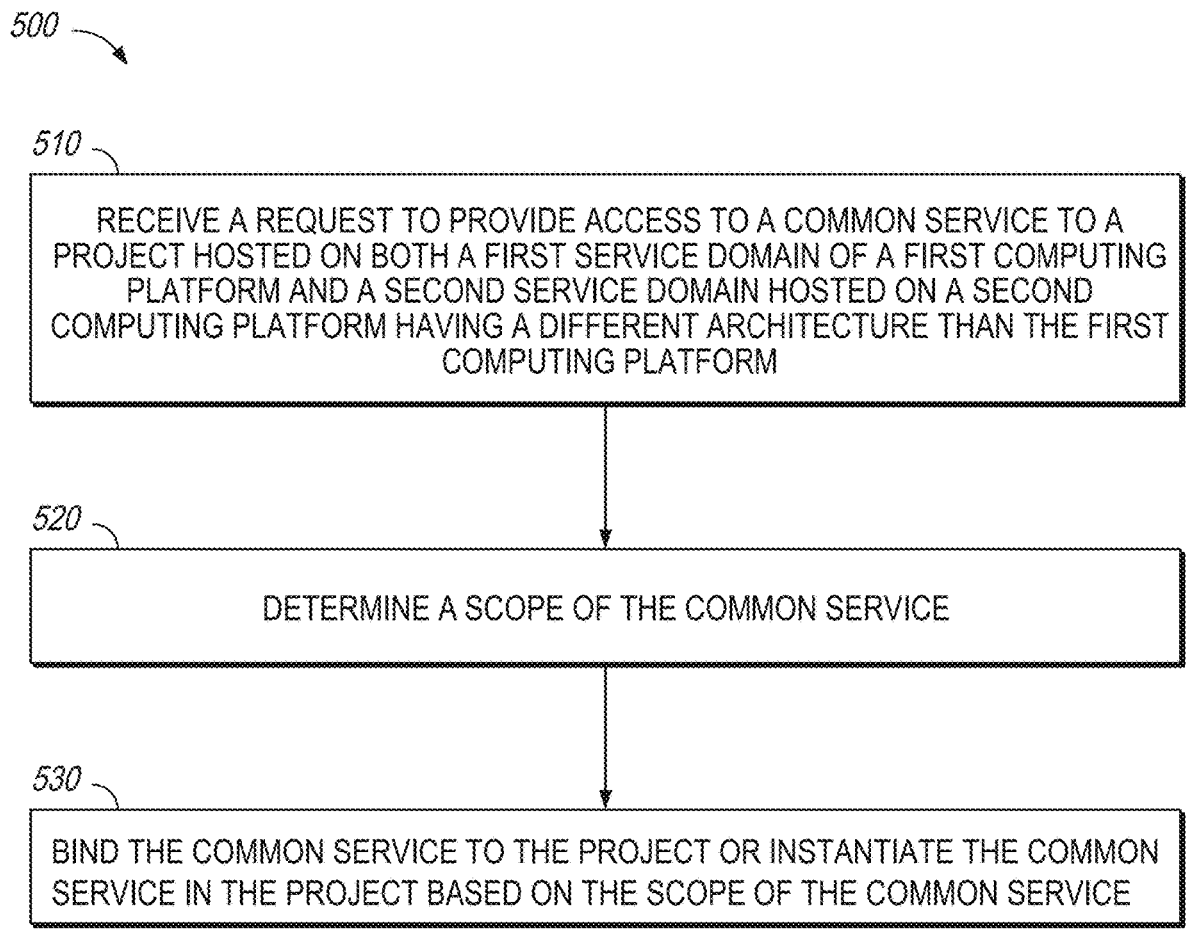
FIG. 5 is a flow diagram of a method 400 to deploy a common service to a service domain, in accordance with an embodiment of the present disclosure.

FIG. 5 is a flow diagram of a method 500 to deploy a common service to a service domain, in accordance with an embodiment of the present disclosure. The method 500 may be performed by the PaaS manager 142 of FIG. 1 and/or the common services model architecture 300 of FIG. 3.

The method 500 may include receiving a request to provide access to or enable a common service for a project hosted on both a first service domain of a first computing platform and a second service domain hosted on a second computing platform having a different architecture than the first computing platform, at 510. The first and second computing platforms may include any of the computing platforms of FIG. 1 configured to host computing cluster service domain(s) 112, the bare metal system service domain(s) 114, and or the cloud computing system service domain(s) 150, and/or the host-computing platform 204 of FIG. 2. In some examples, the method 500 may further include providing a list of service domains available for deployment of the application, including the first and second service domains. In some examples, the method 500 may further include disabling the common service on the project hosted on each of the first and second service domains in response to receipt of a request to disable the common service for the project.

In some examples, the method 500 may further include applying received configuration setting selections to the common service. In some examples, the method 500 may further include providing access to the common service to clients external to the project in response to receipt of a user selection.

The method 500 may further include determining a scope of the common service, at 520. In some examples, the method 500 may further include deploying at least one of a runtime service, a data service, or tool to the first and second service domains. The method 500 may further include binding the common service to the project or instantiating the common service in the project based on the scope of the common service, at 530. In some examples, the method 500 may further include binding the common service to the project in response to the scope of the common service being a service domain-level scope. In some examples, the method 500 may further include binding a second version of the common service to the project in response to receipt of a second request, wherein the second version of the common service has different configuration settings than the common service. In some examples, the method 500 may further include instantiating the common service in the project in response to the scope of the common service being a project-level scope. In some examples, the method 500 may further include monitoring health of the common service after deployment to the first and second service domains.

The method 500 may be implemented as instructions stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform the method 500.

Figure 6:
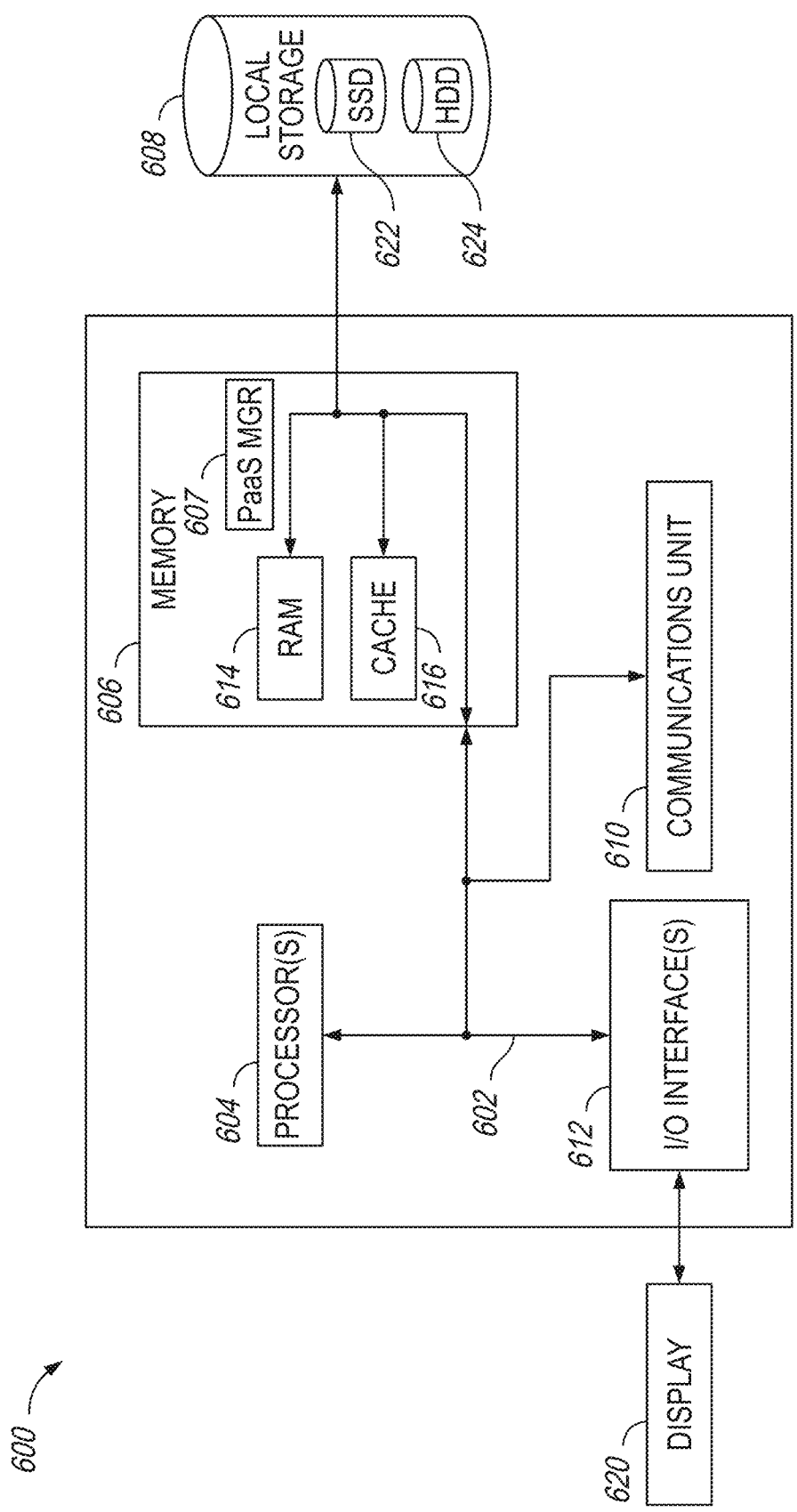
FIG. 6 is a block diagram of components of a computing node in accordance with an embodiment of the present disclosure.

FIG. 6 depicts a block diagram of components of a computing node (device) 600 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made. The computing node 600 may implemented as at least part of the central computing system 140 (or any other computing device or part of any other system described herein) of FIG. 1 and/or at least part of the common services model architecture 300 of FIG. 3. In some examples, the computing node 600 may be configured to perform at least part of the method 500 of FIG. 5. In some examples, the computing node 600 may be a standalone computing node or part of a cluster of computing nodes configured to host a PaaS manager 607. In addition to or alternative to hosting the PaaS manager 607, the computing node 600 may be included as at least part of the computing cluster, the bare metal computing platform, or the cloud computing platform described with reference to FIG. 1 configured to host the described service domains.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. In an embodiment, the local storage 608 includes an SSD 622 and an HDD 624.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

In some examples, the local storage may be configured to store a PaaS manager 607 that is configured to, when executed by the processor(s) 604, to implement a common services model to deploy selected services from a common set of services to service domains hosted on multiple different cloud platforms. In some examples, the PaaS manager 607 may include an interface to set up projects and to deploy services. In some examples, projects can span multiple service domains and can reference cloud profiles. In some examples, a service can be enabled and/or disabled on a per project basis, such that a service can be used by all apps and pipelines within a project, but may not be accessible to apps and pipelines in other projects. When creating a project, a list of available services may be presented for selection. In addition, the PaaS manager 607 may provide an interface to select/change various configuration parameters for a particular service to be deployed to one or more service domains. In some examples, services may be accessed from applications running inside a project on a service domain or by external clients. The service model may publish an application programming interface (API) endpoint for each project for which the service has been enabled. In some examples, API endpoints may be the same or may be different for different projects. Services can be exposed externally by making the API endpoint public.

In some examples, the PaaS manager 607 may provide an interface to update respective configuration parameters or settings for a service. The configuration parameters or settings may be service-specific. The configuration parameters may be defined using an OpenAPI schema, in some examples. The PaaS manager 607 may also monitor the health of services deployed to service domains, as well as may monitor other service-specific criteria. In some examples, functionality of the PaaS manager 607 may be distributed across multiple virtual machine or container instances each configured to manage a respective subset of service domains, projects, services, etc.

In some examples, instantiation and configuration of services may have different scope. For example, one group of services may be service domain-level scope and another group of services may be project-level scope.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 608 via I/O interface(s) 612. I/O interface(s) 612 also connect to a display 620.

Display 62 provides a mechanism to display data to a user and may be, for example, a computer monitor. In some examples, a GUI associated with the PaaS manager interface 104 of FIG. 1 may be presented on the display 620. Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments of the disclosure have been described herein for purposes of illustration, various modifications may be made without deviating from the spirit and scope of the disclosure.

What is claimed is:

1. At least one non-transitory computer-readable storage medium including instructions that, when executed by a computing node, cause the computing node to:
receive a request to provide access to or enable a common service for a project hosted on both a first service domain of a first computing platform and a second service domain hosted on a second computing platform having a different architecture than the first computing platform;
determine a scope of the common service; and
bind the common service to the project or instantiate the common service in the project based on the scope of the common service.

2. The at least one computer-readable storage medium of claim 1, wherein the instructions further cause the computing node to bind the common service to the project in response to the scope of the common service being a service domain-level scope.

3. The at least one computer-readable storage medium of claim 2, wherein the instructions further cause the computing node to bind a second version of the common service to the project in response to receipt of a second request, wherein the second version of the common service has different configuration settings than the common service.

4. The at least one computer-readable storage medium of claim 1, wherein the instructions further cause the computing node to instantiate the common service in the project in response to the scope of the common service being a project-level scope.

5. The at least one computer-readable storage medium of claim 1, wherein the instructions further cause the computing node to apply received configuration setting selections to the common service.

6. The at least one computer-readable storage medium of claim 1, wherein the instructions further cause the computing node to provide access to the common service to clients external to the project in response to receipt of a user selection.

7. The at least one computer-readable storage medium of claim 1, wherein the instructions further cause the computing node to monitor health of the common service after deployment to the first and second service domains.

8. The at least one computer-readable storage medium of claim 1, wherein the instructions further cause the computing node to monitor a service-specific entity report from the common service.

9. The at least one computer-readable storage medium of claim 1, wherein the common service includes a read/write data service.

10. The at least one computer-readable storage medium of claim 1, wherein the common service includes a runtime service.

11. The at least one computer-readable storage medium of claim 1, wherein the common service includes a machine learning inference service.

12. The at least one computer-readable storage medium of claim 1, wherein the instructions further cause the computing node to disable the common service on the project hosted on each of the first and second service domains in response to receipt of a request to disable the common service for the project.

13. A system, comprising:
- a first service domain hosted on a first computing platform having a first architecture, wherein the first service domain includes a project and a common service;
- a second service domain hosted on a second computing platform having a second architecture, wherein the second service domain includes the project and the common service; and
- a platform-as-a-service (PaaS) manager hosted on a computing node, wherein, in response to receipt of a request to provide access to the common service to the project, determine a scope of the common service, and bind the common service to the project or instantiating the common service in the project based on the scope of the common service.

14. The system of claim 13, wherein the PaaS manager is further configured to bind the common service to the project in response to the scope of the common service being a service domain-level scope.

15. The system of claim 14, wherein the PaaS Manager is further configured to bind a second version of the common service to the project in response to receipt of a second request, wherein the second version of the common service has different configuration settings than the common service.

16. The system of claim 13, wherein the PaaS Manager is further configured to instantiate the common service in the project in response to the scope of the common service being a project-level scope.

17. The system of claim 13, wherein the PaaS manager is further configured to apply received configuration setting selections to the common service.

18. The system of claim 13, wherein the PaaS manager is further configured to provide access to the common service to clients external to the project in response to receipt of a user selection.

19. The system of claim 13, wherein the PaaS manager is further configured to monitor health of the common service after deployment to the first and second service domains.

20. The system of claim 13, wherein the PaaS manager is further configured to disable the common service on the project hosted on each of the first and second service domains in response to receipt of a request to disable the common service for the project.

21. A method, comprising:
- receiving a request to provide access to or enable a common service for a project hosted on both a first service domain of a first computing platform and a second service domain hosted on a second computing platform of a first cloud service provider different than a second cloud service provider for the first computing platform;
- determining a scope of the common service; and
- binding the common service to the project or instantiate the common service in the project based on the scope of the common service.

22. The method of claim 21, further comprising binding the common service to the project in response to the scope of the common service being a service domain-level scope.

23. The method of claim 21, further comprising binding a second version of the common service to the project in response to receipt of a second request, wherein the second version of the common service has different configuration settings than the common service.

24. The method of claim 21, further comprising instantiating the common service in the project in response to the scope of the common service being a project-level scope.

25. The method of claim 21, further comprising applying received configuration setting selections to the common service.

26. The method of claim 21, further comprising providing access to the common service to a client external to the project in response to receipt of a request via an exposed endpoint generated for the common service.

27. The method of claim 21, further comprising monitoring health of the common service after deployment to the first and second service domains.

28. The method of claim 21, further comprising receiving the request to provide access to or enable at least one of a read/write data service, a runtime service, or a machine learning inference service as the common service for the project.

29. The method of claim 21, further comprising disabling the common service on the project hosted on each of the first and second service domains in response to receipt of a request to disable the common service for the project.

* * * * *

UNITED STATES PATENT AND TRADEMARK OFFICE
CERTIFICATE OF CORRECTION

| | | |
|---|---|---|
| PATENT NO. | : 11,665,221 B2 | |
| APPLICATION NO. | : 17/376581 | |
| DATED | : May 30, 2023 | |
| INVENTOR(S) | : Akhilesh Joshi et al. | |

It is certified that error appears in the above-identified patent and that said Letters Patent is hereby corrected as shown below:

In the Claims

Claim 13, Column 21, Line 12, change "determine a scope of the common service, and bind the common service to the project or instantiating the common service" to --determines a scope of the common service, and binds the common service to the project or instantiates the common service--.

Claim 21, Column 22, Lines 10-11, change "instantiate the common service" to --instantiating the common service--.

Signed and Sealed this
Fourteenth Day of May, 2024

Katherine Kelly Vidal
*Director of the United States Patent and Trademark Office*